(12) United States Patent
Tsukahara et al.

(10) Patent No.: US 9,710,132 B2
(45) Date of Patent: Jul. 18, 2017

(54) IMAGE DISPLAY APPARATUS AND IMAGE DISPLAY METHOD

(71) Applicant: Sony Corporation, Tokyo (JP)

(72) Inventors: Tsubasa Tsukahara, Tokyo (JP);
Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/609,667

(22) Filed: Jan. 30, 2015

(65) Prior Publication Data

US 2015/0228121 A1     Aug. 13, 2015

(30) Foreign Application Priority Data

Feb. 7, 2014   (JP) ................................. 2014-021834

(51) Int. Cl.
*G06F 3/0481* (2013.01)
*G06F 3/01* (2006.01)

(52) U.S. Cl.
CPC .......... *G06F 3/04815* (2013.01); *G06F 3/012* (2013.01); *G06F 3/04817* (2013.01)

(58) Field of Classification Search
CPC ... G06F 3/04817; G06F 3/012; G06F 3/04815
See application file for complete search history.

(56) References Cited

U.S. PATENT DOCUMENTS

| | | | | |
|---|---|---|---|---|
| 5,414,805 A | * | 5/1995 | Gordon | G06T 13/80 345/427 |
| 8,656,311 B1 | * | 2/2014 | Harper | G06F 3/0488 345/532 |
| 2007/0195082 A1 | * | 8/2007 | Takanashi | G06T 15/20 345/419 |
| 2008/0225007 A1 | * | 9/2008 | Nakadaira | G06F 3/04815 345/173 |
| 2011/0093778 A1 | * | 4/2011 | Kim | G06F 3/041 715/702 |
| 2013/0332871 A1 | * | 12/2013 | Bucur | G06T 19/00 715/768 |
| 2014/0368532 A1 | * | 12/2014 | Keane | G02B 27/017 345/619 |
| 2016/0004320 A1 | * | 1/2016 | Lundberg | G06K 9/48 345/633 |

FOREIGN PATENT DOCUMENTS

JP    2012-042654    3/2012

* cited by examiner

*Primary Examiner* — James A Thompson
(74) *Attorney, Agent, or Firm* — Paratus Law Group, PLLC

(57) ABSTRACT

Provided is an image display apparatus, including: a display unit configured to allow a real space to be transparently viewed and configured to display a three-dimensional image; and a display control unit configured to display a plurality of the three-dimensional images on the display unit in a manner that the plurality of the three-dimensional images are arranged in a plurality of lines that are different from each other in position in a depth direction on a near side with respect to the real space.

13 Claims, 19 Drawing Sheets

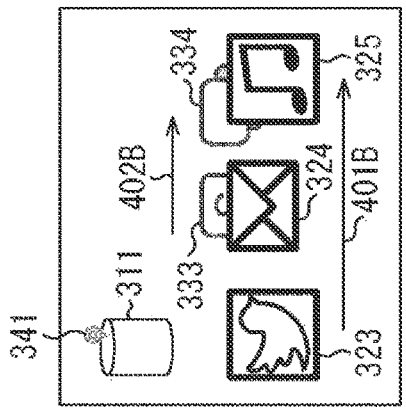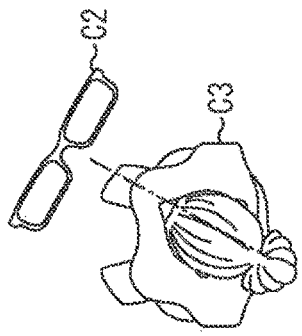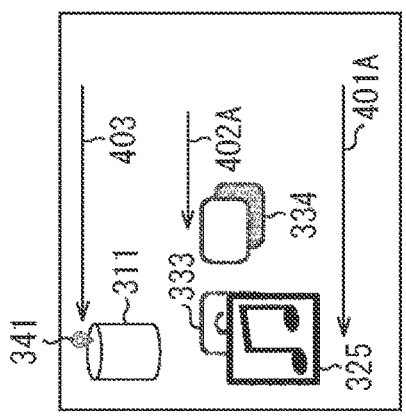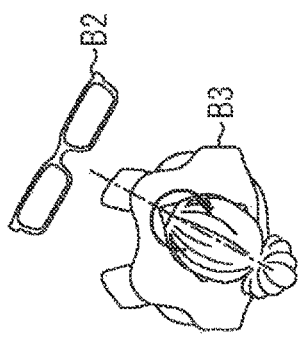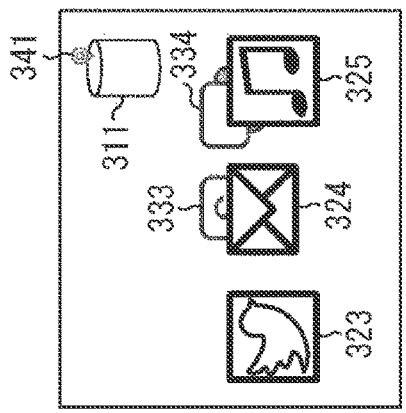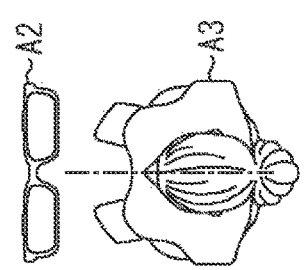
FIG. 13A  FIG. 13B  FIG. 13C

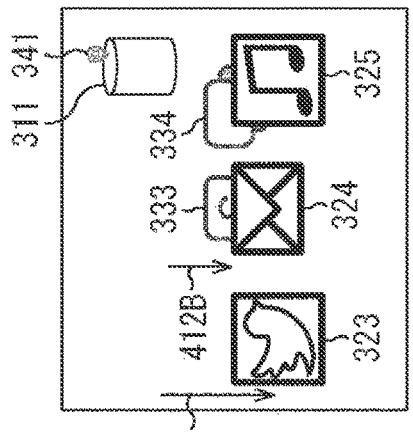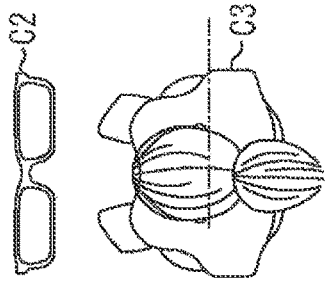
FIG. 14C
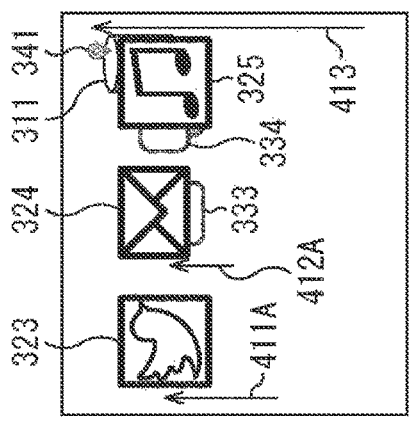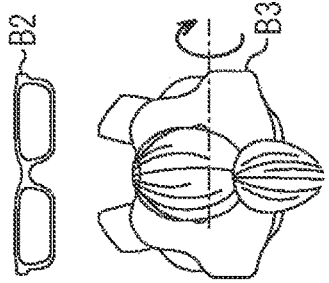
FIG. 14B
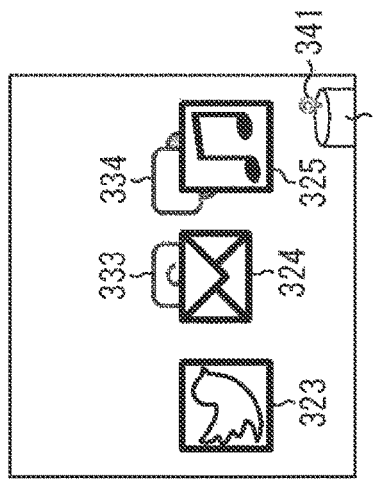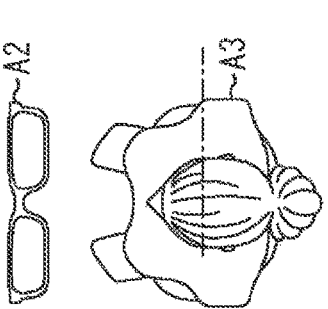
FIG. 14A

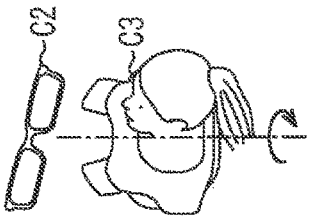
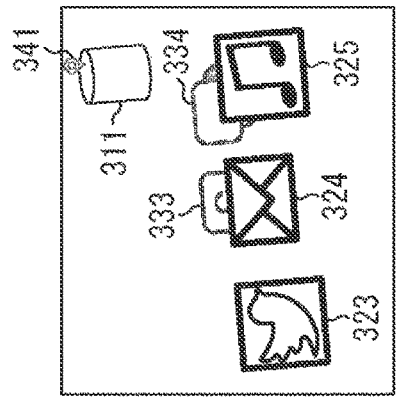
FIG.17C
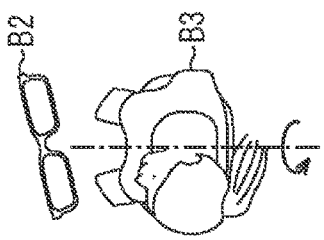
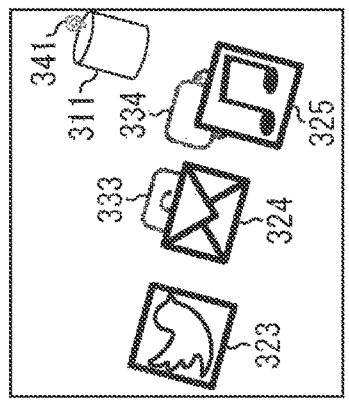
FIG.17B
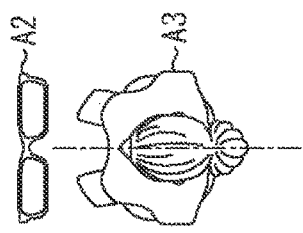
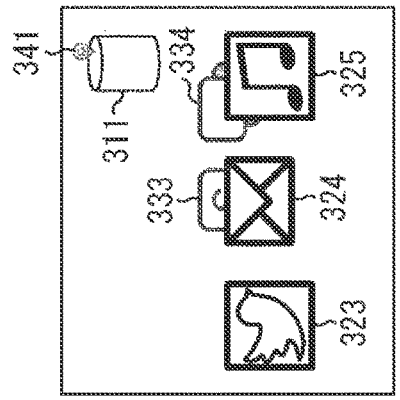
FIG.17A

IMAGE DISPLAY APPARATUS AND IMAGE DISPLAY METHOD

CROSS REFERENCE TO RELATED APPLICATIONS

This application claims the benefit of Japanese Priority Patent Application JP 2014-021834 filed Feb. 7, 2014, the entire contents of which are incorporated herein by reference.

BACKGROUND

The present disclosure relates to an image display apparatus and an image display method, and more specifically, to an image display apparatus and an image display method that provide higher operability.

In recent years, development of transmissive HMDs (Head Mounted Displays) has been started. For example, there has been proposed an idea of a transmissive HMD that expresses a sense of depth by adjusting binocular parallax and a convergence angle (refer, for example, to Japanese Patent Application Laid-open No. 2012-42654). More specifically, there has been proposed an idea of displaying, by using such a system, display objects such as menu icons under a state in which those display objects are superimposed on a scene in a real space.

SUMMARY

However, in recent years, functions of such transmissive HMDs have become more diversified, and in accordance therewith, a larger number of display objects to be displayed, such as menu icons, are displayed. Thus, when all the display objects to be displayed are displayed as they are, there arise problems that the display objects are downsized, target icons need to be searched for from among the large number of display objects, and the real space is difficult to view due to superimposition of the large number of icons on a near side. Such problems may cause deterioration in operability.

There is a need to enhance operability of such display objects.

According to an embodiment of the present technology, there is provided an image display apparatus, including a display unit configured to allow a real space to be transparently viewed and configured to display a three-dimensional image, and a display control unit configured to display a plurality of the three-dimensional images on the display unit in a manner that the plurality of the three-dimensional images are arranged in a plurality of lines that are different from each other in position in a depth direction on a near side with respect to the real space.

The display control unit is capable of controlling sizes of the plurality of the three-dimensional images in accordance with the positions in the depth direction of the plurality of lines in which the plurality of the three-dimensional images are arranged.

The display control unit is capable of controlling at least one of value, chroma, and contrast of the plurality of the three-dimensional images in accordance with the positions in the depth direction of the plurality of lines in which the plurality of the three-dimensional images are arranged.

The display control unit is capable of controlling, in accordance with the positions in the depth direction of the plurality of lines in which the plurality of the three-dimensional images are arranged, an interval between the plurality of the three-dimensional images in each of the plurality of lines.

The display control unit is capable of controlling, in accordance with the positions in the depth direction of the plurality of lines in which the plurality of the three-dimensional images are arranged, an interval between the plurality of lines in the depth direction.

The plurality of lines in which the plurality of the three-dimensional images are arranged include a line on a depth side as viewed from a user, and a line on the near side as viewed from the user.

The plurality of the three-dimensional images include a plurality of three-dimensional images that are arranged in the line on the depth side as viewed from the user, and a plurality of three-dimensional images that are arranged in the line on the near side as viewed from the user. The display control unit is capable of controlling display positions of the plurality of the three-dimensional images so that at least parts of the plurality of three-dimensional images that are arranged in the line on the depth side as viewed from the user are hidden by the plurality of three-dimensional images that are arranged in the line on the near side as viewed from the user.

The display control unit is capable of controlling hues of the plurality of the three-dimensional images in accordance with the positions in the depth direction of the plurality of lines in which the plurality of the three-dimensional images are arranged.

The display control unit is capable of controlling degrees of focusing of the plurality of the three-dimensional images in accordance with the positions in the depth direction of the plurality of lines in which the plurality of the three-dimensional images are arranged.

The display control unit is capable of controlling, in accordance with roles assigned respectively to the plurality of the three-dimensional images, in which of the plurality of lines the plurality of the three-dimensional images are arranged.

The image display apparatus according to the embodiment of the present technology further includes a detection unit configured to detect changes in at least one of position and orientation of the display unit. The display control unit is capable of causing, when the detection unit detects the changes in the at least one of position and orientation of the display unit, the plurality of the three-dimensional images to be moved in accordance with the changes.

The display control unit is capable of causing, when the detection unit starts to detect the changes in the at least one of position and orientation of the display unit, display positions of the plurality of the three-dimensional images to be moved from positions with respect to which the display unit has not yet been changed in any of position and orientation into a direction opposite to a direction in which the display unit has been changed in the at least one of position and orientation. The display control unit is capable of causing, when the detection unit detects that the changes in the at least one of position and orientation have ended, the display positions of the plurality of the three-dimensional images to be returned to the positions with respect to which the display unit has not yet been changed in the any of position and orientation.

The plurality of lines in which the plurality of the three-dimensional images are arranged include a line on a deeper side as viewed from a user, and a line on a nearer side as viewed from the user. The plurality of the three-dimensional images include a plurality of three-dimensional images that are arranged in the line on the deeper side as viewed from the user, and a plurality of three-dimensional images that are arranged in the line on the nearer side as viewed from the user. The display control unit is capable of causing the plurality of three-dimensional images that are arranged in the line on the nearer side as viewed from the user to be moved by an amount larger than an amount of moving the plurality of three-dimensional images that are arranged in the line on the deeper side as viewed from the user.

The plurality of lines in which the plurality of the three-dimensional images are arranged include a line on a deeper side as viewed from a user, and a line on a nearer side as viewed from the user. The plurality of the three-dimensional images include a plurality of three-dimensional images that are arranged in the line on the deeper side as viewed from the user, and a plurality of three-dimensional images that are arranged in the line on the nearer side as viewed from the user. The display control unit is capable of causing the plurality of three-dimensional images that are arranged in the line on the nearer side as viewed from the user to be moved earlier than the plurality of three-dimensional images that are arranged in the line on the deeper side as viewed from the user.

According to another embodiment of the present technology, there is provided an image display method, including displaying a plurality of three-dimensional images on a display unit in a manner that the plurality of three-dimensional images are arranged in a plurality of lines that are different from each other in position in a depth direction on a near side with respect to a real space, the display unit being configured to allow the real space to be transparently viewed and configured to display the plurality of three-dimensional images.

According to the embodiments of the present technology, a plurality of three-dimensional images are displayed on a display unit in a manner that the plurality of three-dimensional images are arranged in a plurality of lines that are different from each other in position in a depth direction on a near side with respect to a real space, the display unit being configured to allow the real space to be transparently viewed and configured to display the plurality of three-dimensional images.

According to the embodiments of the present technology, photographic subjects can be imaged. Further, according to the embodiments of the present technology, operability can be enhanced.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 13A-13C are views of an example of movements in a horizontal direction of the display objects;

FIGS. 14A-14C are views of an example of movements in a vertical direction of the display objects;

FIGS. 17A-17C are views of an example of movements in turning directions of the display objects;

DETAILED DESCRIPTION OF EMBODIMENTS

In the following, description is made of embodiments for carrying out the present disclosure (hereinafter, simply referred to as embodiments). Note that, the description is made in the following order.

1. First embodiment (image display apparatus)
2. Second embodiment (transmissive HMD)
(1. First Embodiment)
(Display of Three-Dimensional Image)

In recent years, development of transmissive HMDs (Head Mounted Displays) has been started. The transmissive HMDs use a display unit (transmissive display) configured to transmit light from a rear surface side thereof and allow a real space to be viewed on the rear surface side. With this, a user of the transmissive HMD can see images displayed on the transmissive display under a state in which the images are superimposed on a scene in the real space on the rear surface side of the transmissive display.

There has been proposed an idea of displaying, on such a transmissive display, predetermined images (display objects) in GUIs (Graphical User Interfaces), such as menu icons to be displayed on the transmissive HMD. However, even by such a display configuration, when a sense of depth of the display objects is poor, the images may become visually unnatural to cause a sense of discomfort to the user. As a result, operability may be deteriorated.

In this context, as a method of displaying images on the transmissive display, Japanese Patent Application Laid-open No. 2012-42654 discloses a method of expressing a sense of depth by adjusting binocular parallax and convergence angles of the images. However, also in a case where such a display configuration is applied to the display objects, a sense of depth of the display objects is insufficient with respect to the scene in the real space. Also in this case, the images may become visually unnatural to cause a sense of discomfort to the user. As a result, the operability may be deteriorated.

Figure 1:
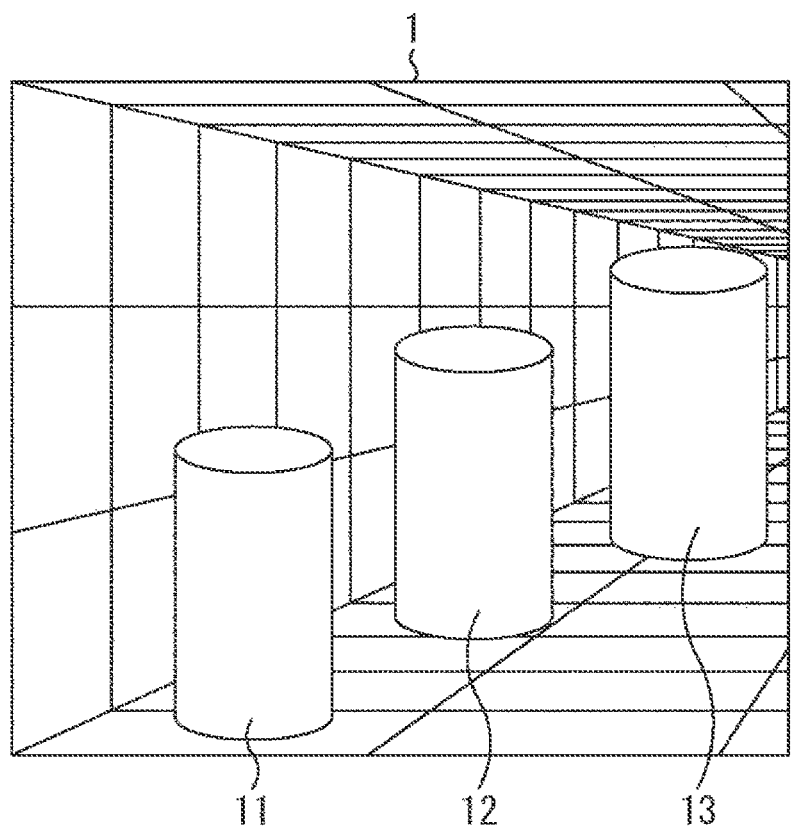
FIG. 1 is a view of an example of virtual image display positions in a three-dimensional image.

For example, as illustrated in FIG. 1, cylinders 11 to 13 are virtual images superimposed on a scene 1 in the real space. Positions at which virtual presence of those cylinders is recognized (also referred to as virtual image positions) are set to positions that are different from each other in a depth direction. Nevertheless, the sense of depth is poor, and hence does not match with a sense of perspective in the scene in the real space. As a result, the images are visually unnaturally displayed to cause a sense of discomfort to the user.

Further, in recent years, functions of such transmissive HMDs have become more diversified, and in accordance therewith, a larger number of display objects such as menu icons need to be displayed. Thus, when all the display objects to be displayed are displayed as they are, there arise problems that the display objects are downsized, target icons need to be searched for from among the large number of display objects, and the real space is difficult to view due to superimposition of the large number of icons on a near side. Such problems may cause deterioration in operability.

(Image Display Apparatus)

In view of the circumstances, there is provided an image display apparatus including a display unit configured to allow a real space to be transparently viewed, and configured to display a three-dimensional image, and a display control unit configured to display a plurality of the three-dimensional images on the display unit in a manner that the plurality of the three-dimensional images are arranged in a plurality of lines that are different from each other in position in a depth direction on a near side with respect to the real space.

In other words, the image display apparatus causes the display unit, which is configured to allow the real space to be transparently viewed and configured to display the three-dimensional image, to display the plurality of the three-dimensional images in a manner that the plurality of the three-dimensional images are arranged in the plurality of lines that are different from each other in position in the depth direction on the near side with respect to the real space.

Specifically, the display objects such as menu icons are displayed on a display unit 112 as the three-dimensional images in the plurality of lines that are different from each other in position in the depth direction. With this, the number of the display objects in each of the lines is reduced. Thus, for example, the display objects can be displayed on an enlarged scale, and the user can select display objects of target menu icons from among a smaller number of the display objects (display objects in a single line). In this way, operability can be enhanced.

Further, the display control unit may control sizes of the display objects as the three-dimensional images in accordance with the positions in the depth direction of the lines in which the display objects are arranged. With this, the sense of depth of the display objects can be increased, and the operability can be enhanced.

Still Further, the display control unit may control at least one of value, chroma, and contrast of the display objects in accordance with the positions in the depth direction of the lines in which the display objects are arranged. With this, the sense of depth of the display objects can be increased, and the operability can be enhanced.

Yet further, the display control unit may control, in accordance with the positions in the depth direction of the lines in which the display objects are arranged, an interval between the display objects in each of the lines. With this, the sense of depth of the display objects can be increased, and the operability can be enhanced.

Yet further, the display control unit may control, in accordance with the positions in the depth direction of the lines in which the display objects are arranged, an interval between the lines in the depth direction. With this, the sense of depth of the display objects can be increased, and the operability can be enhanced.

Yet further, the display control unit may control display positions of the display objects so that at least parts of the display objects that are arranged in the line on a depth side as viewed from the user are hidden by the display objects that are arranged in the line on the near side as viewed from the user. With this, the sense of depth of the display objects can be increased, and the operability can be enhanced.

Yet further, the display control unit may control hues of the display objects in accordance with the positions in the depth direction of the lines in which the display objects are arranged. With this, the sense of depth of the display objects can be increased, and the operability can be enhanced.

Yet further, the display control unit may control degrees of focusing of the display objects in accordance with the positions in the depth direction of the lines in which the display objects are arranged. With this, the sense of depth of the display objects can be increased, and the operability can be enhanced.

Yet further, the display control unit may control, in accordance with roles assigned respectively to the display objects, in which of the lines the display objects are arranged. With this, based on the display positions of the display objects (positions in the depth direction), the user can easily recognize the roles assigned respectively to the display objects, such as types of menu icons. In other words, the user can more easily find target display objects. In this way, the operability can be enhanced.

Yet further, the image display apparatus may further includes a detection unit configured to detect changes in at least one of position and orientation of the display unit so that, when the detection unit detects the changes in the at least one of position and orientation of the display unit, the display control unit causes the display objects to be moved in accordance with the changes. With this, the display objects and physical objects in the real space can be easily distinguished from each other, and the operability can be enhanced.

Yet further, when the detection unit starts to detect the changes in the at least one of position and orientation of the display unit, the display control unit may cause the display positions of the display objects to be moved from positions with respect to which the display unit has not yet been changed in any of position and orientation into a direction opposite to a direction in which the display unit has been changed in the at least one of position and orientation. When the detection unit detects that the changes in the at least one of position and orientation have ended, the display control unit may cause the display positions of the display objects to be returned to the positions with respect to which the display unit has not yet been changed in the any of position and orientation. With this, the display objects and physical objects in the real space can be easily distinguished from each other, and the operability can be enhanced.

Yet further, the display control unit may cause the display objects that are arranged in the line on a nearer side as viewed from the user to be moved by an amount larger than an amount of moving the display objects that are arranged in the line on a deeper side as viewed from the user. With this, the sense of depth of the display objects can be increased, and the operability can be enhanced.

Yet further, the display control unit may cause the display objects that are arranged in the line on the nearer side as viewed from the user to be moved earlier than the display objects that are arranged in the line on the deeper side as viewed from the user. With this, the sense of depth of the display objects can be increased, and the operability can be enhanced.

Yet further, the display control unit may execute arbitrary ones of the various processes described above in various combinations.

Note that, the above-mentioned display objects may be displayed on a non-transmissive display unit that is configured not to transmit light. Specifically, on the non-transmissive display unit, images to be viewed from a plurality of viewpoints (for example, display objects such as a menu icon) may be displayed as a three-dimensional image in a superimposed manner on captured images obtained by an imaging unit (also referred to as through images). Also in that case, as in the case where the display objects are displayed on the transmissive display unit described above, it is only necessary to generate left-eye images and right-eye images of the display objects and display those images on the display unit in a manner that the display objects are arranged in a plurality of lines that are different from each other in position in the depth direction on the near side with respect to a scene in the real space.

In other words, the above description "to allow the real space to be transparently viewed" conceptually includes not only "to allow a scene in the real space on the rear surface side of the display to be viewed through the display" as in the case of the transmissive display, but also "to allow the through images to be viewed, which are obtained by the imaging unit and displayed on the display" as in the case of the above-mentioned non-transmissive display.

(2. Second Embodiment)

(External Appearance of Transmissive HMD)

Figure 2A:
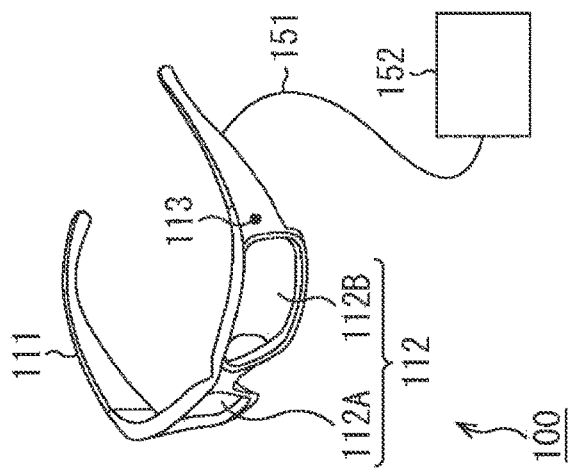
FIGS. 2A-2C are views of examples of an external appearance of a transmissive HMD.
Figure 2B:
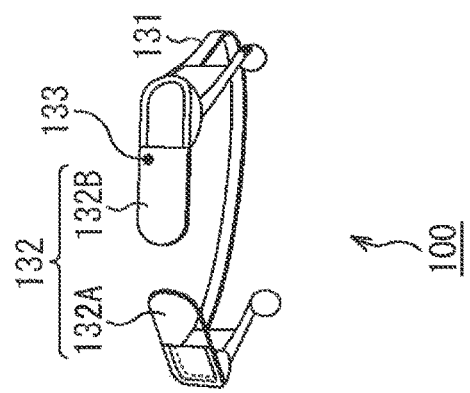
Figure 2C:
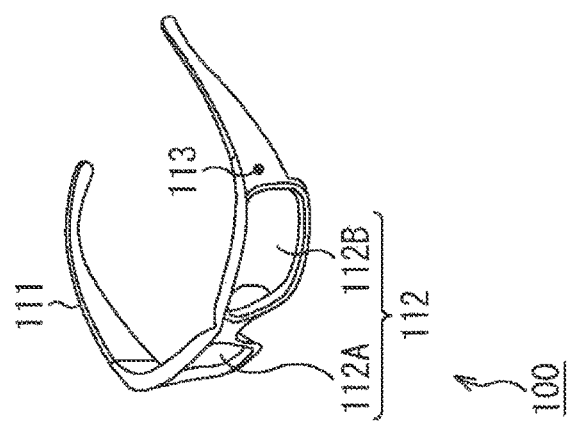

The present technology is applicable not only to the image display apparatus, but also, for example, to transmissive HMDs. FIG. 2A-2C are views of an embodiment of the image display apparatus, specifically, illustrating examples of an external appearance of the transmissive HMD to which the present technology is applied. More specifically, as illustrated in FIG. 2A, a frame 111 of a transmissive HMD 100 has what is called an eyeglass shape so as to be used, as well as eyeglasses, while being fitted to the face of a user by hooking end portions of the frame 111 to the ears of the user.

Parts corresponding to lenses of eyeglasses serve as the display unit 112 (right-eye display unit 112A and left-eye display unit 112B). When the user wears the transmissive HMD 100, the right-eye display unit 112A comes close to the front of the right eye of the user, and the left-eye display unit 112B comes close to the front of the left eye of the user.

The display unit 112 is a transmissive display configured to transmit light. Thus, a scene in a real space on a rear surface side of the right-eye display unit 112A, that is, in front of the right-eye display unit 112A (transparent video) is visible to the right eye of the user through the right-eye display unit 112A. Similarly, a scene in the real space on a rear surface side of the left-eye display unit 112B, that is, in front of the left-eye display unit 112B (transparent video) is visible to the left eye of the user through the left-eye display unit 112B. Thus, images that are displayed on the display unit 112 are visible to the user under a state in which the images are superimposed on a near side of the scene in the real space in front of the display unit 112.

The right-eye display unit 112A is configured to display images to the right eye of the user (right-eye images), and the left-eye display unit 112B is configured to display images to the left eye of the user (left-eye images). In other words, the display unit 112 is capable of displaying different images respectively on the right-eye display unit 112A and the left-eye display unit 112B, for example, displaying a three-dimensional image.

The three-dimensional image is formed of the right-eye image and the left-eye image that have binocular parallax and a convergence angle therebetween. By controlling the binocular parallax and the convergence angle, the three-dimensional image is visible to be located far from or near the user. In other words, the three-dimensional image is an image that can be controlled in depth position (position that is not an actual position but a virtual position at which the three-dimensional image is visible to exist thereat exactly as it is to the user (also referred to as virtual-image position)).

In other words, the display unit 112 is capable of displaying images (three-dimensional images) so that the images are visible to the user in a manner of being located in the real space in front of the display unit 112.

Further, as illustrated in FIG. 2A, a hole 113 is formed near the display unit 112 in the frame 111. An imaging unit configured to image photographic subjects is provided near the hole 113 in an inside of the frame 111. The imaging unit images the photographic subjects in the real space in front of the transmissive HMD 100 through the hole 113 (front of the transmissive HMD 100 with respect to the user wearing the transmissive HMD 100). More specifically, the imaging unit images the photographic subjects in the real space located in a display area of the display unit 112 (right-eye display unit 112A and left-eye display unit 112B) as viewed from the user. With this, image data of captured images is generated. The generated image data is, for example, stored in predetermined storage media or transmitted to other devices.

Note that, a position of the hole 113 (that is, imaging unit) may be arbitrarily set, specifically, the hole 113 may be formed at a position other than that in the example illustrated in FIG. 2A. Further, the hole 113 (that is, imaging unit) is not particularly limited in number, specifically, the single hole 113 may be formed as illustrated in FIG. 2A, or a plurality of holes 113 may be formed.

Further, as long as the transmissive HMD 100 can be fitted to the face (head) of the user in a manner that the right-eye display unit 112A comes close to the front of the right eye of the user and that the left-eye display unit 112B comes close to the front of the left eye of the user, the frame 111 is not particularly limited in shape. For example, the transmissive HMD 100 has the shape as illustrated in FIG. 2B.

In the case of the example of FIG. 2B, a frame 131 of the transmissive HMD 100 is formed into a shape of sandwiching and fixing the head of the user from behind. Similar to the display unit 112, a display unit 132 in this case is also a transmissive display. Specifically, the display unit 132 similarly includes a right-eye display unit 132A and a left-eye display unit 132B. When the user wears the transmissive HMD 100, the right-eye display unit 132A comes close to the front of the right eye of the user, and the left-eye display unit 132B comes close to the left eye of the user.

In addition, the right-eye display unit 132A is a display unit equivalent to the right-eye display unit 112A, and the left-eye display unit 132B is a display unit equivalent to the left-eye display unit 112B. In other words, similar to the display unit 112, the display unit 132 is also capable of displaying three-dimensional images.

Further, also in the case of FIG. 2B, as in the case of FIG. 2A, a hole 133 equivalent to the hole 113 is formed near the display unit 132 on the frame 131. An imaging unit configured to image photographic subjects is provided near the hole 133 in an inside of the frame 131. As in the case of FIG.

2A, the imaging unit images the photographic subjects in the real space in front of the transmissive HMD 100 through the hole 133 (front of the transmissive HMD 100 with respect to the user wearing the transmissive HMD 100).

As a matter of course, a position of the hole 133 (that is, imaging unit) may be arbitrarily set as in the case of FIG. 2A, specifically, the hole 133 may be formed at a position other than that in the example illustrated in FIG. 2B. Further, the hole 133 (that is, imaging unit) is also not particularly limited in number as in the case of FIG. 2A.

Alternatively, as in the example illustrated in FIG. 2C, a part of a configuration of the transmissive HMD in the example of FIG. 2A may be provided separately from the frame 111. In the example of FIG. 2C, the frame 111 is connected to a control box 152 via a cable 151.

The cable 151 is a communication path for predetermined wired communication, which electrically connects a circuit in the frame 111 and a circuit in the control box 152 to each other. The control box 152 includes a part of a configuration (such as circuit) in the frame 111 in the case of the example of FIG. 2A. Specifically, the control box 152 may include a control unit and a storage unit configured to store image data. The circuit in the frame 111 and the circuit in the control box 152 may communicate to each other. The imaging unit in the frame 111 may perform imaging under control by the control unit in the control box 152. The image data of images captured by the imaging may be supplied to the control box 152, and stored to the storage unit therein.

The control box 152 can be stored, for example, in a pocket of a garment of the user. With this configuration, the frame 111 of the transmissive HMD 100 can be downsized in comparison with that in the case of FIG. 2A.

Note that, the communication between the circuit in the frame 111 and the circuit in the control box 152 may be performed in a wired manner or may be performed in a wireless manner. In a case of the wireless communication, the cable 151 can be omitted.

(Example of Internal Configuration)

Figure 3:
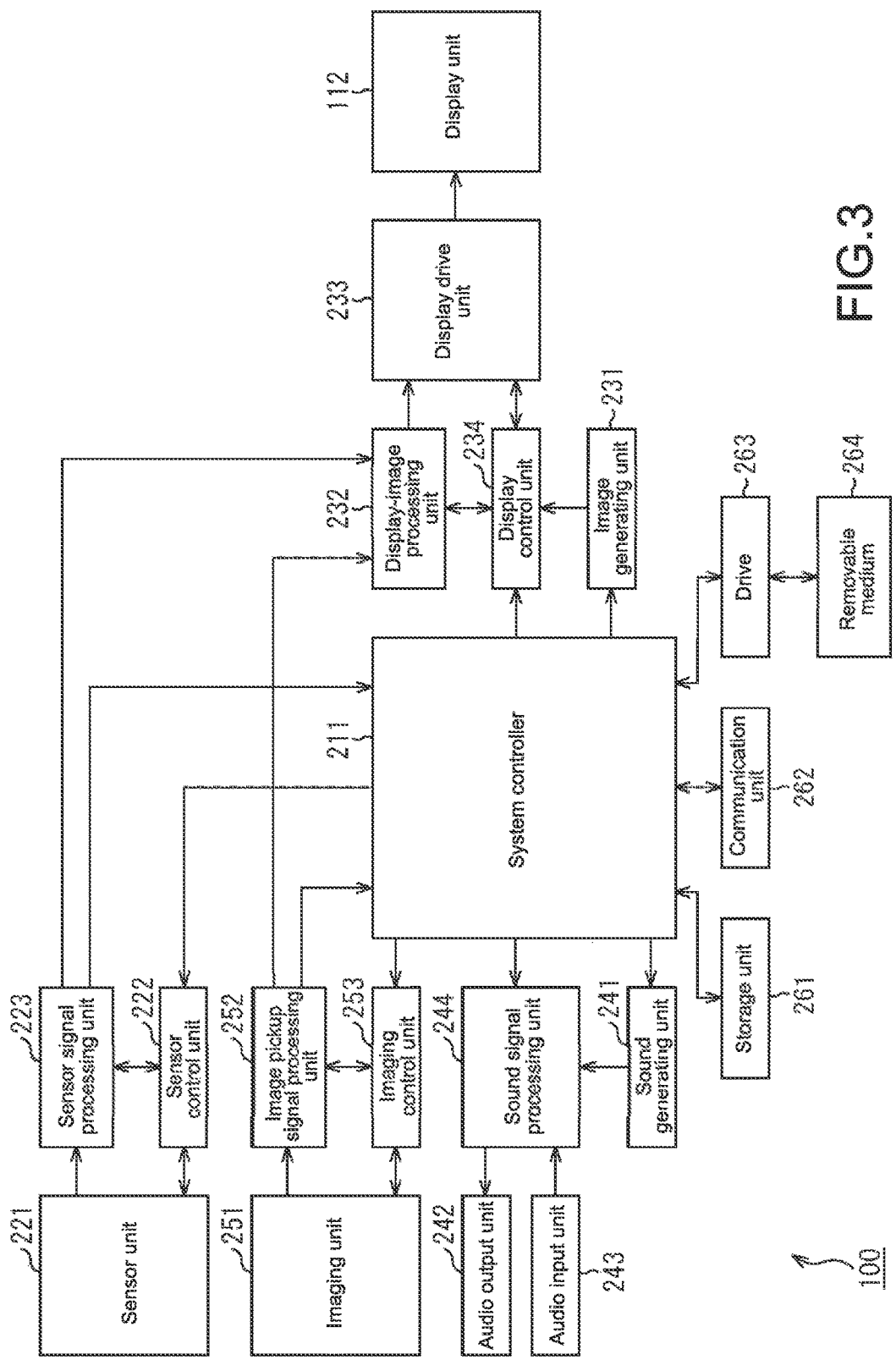
FIG. 3 is a block diagram of a main configuration example of the transmissive HMD.

FIG. 3 is a block diagram of an example of an internal configuration of the transmissive HMD 100. As illustrated in FIG. 3, the transmissive HMD 100 includes a system controller 211.

The system controller 211 is formed of a microcomputer including a CPU (Central Processing Unit), a ROM (Read Only Memory), a RAM (Random Access Memory), a non-volatile memory unit, and an interface unit, and is configured to control units of the transmissive HMD 100. The system controller 211 controls the units based on internal operating programs. For example, by controlling the units, the system controller 211 executes display control of images to be displayed on the display unit 112.

Further, the transmissive HMD 100 includes a sensor unit 221, a sensor control unit 222, and a sensor signal processing unit 223.

The sensor unit 221 includes arbitrary sensors mounted near the display unit 112, such as an acceleration sensor, a gyro sensor, a magnetic sensor, and a barometric sensor. With this, for example, movements of the head and the neck of the user and movements of the transmissive HMD 100 are detected as signals in response to movements of the user. Further, the sensor unit 221 may also include a capacitive sensor, a button, and a GPS (Global Positioning System) so that signals from a system of those sensors to be used by the user at the time of operating the transmissive HMD 100 are also processed in this unit.

In other words, the sensor unit 221 includes an arbitrary input device, and accepts information to be input via the input device. A position of such an input device is not limited to near the display unit 112, and may be arbitrarily set.

Further, the sensor unit 221 may also include a sensor configured to detect, for example, sight lines of the user. Examples of such a sensor of the sensor unit 221 include an imaging unit (sight-line imaging unit) arranged near the display unit 112, which is configured to image eyes of the user. In this case, for example, the system controller 211 may perform image analysis of images of the eyes of the user, which are captured by the sight-line imaging unit, so that a sight-line direction, a focal length, pupil opening degrees, fundus patterns, and whether the eyelids are opened or closed are detected. Alternatively, the sensor unit 221 may include, instead of such a sight-line imaging unit, a light emitting unit arranged near the display unit 112, which is configured to radiate light to the eyes of the user, and a light receiving unit configured to receive reflected light from the eyes, perform photoelectric conversion of the reflected light, and output an electrical signal (light receiving signal) that is generated by the photoelectric conversion. In that case, the system controller 211 may be configured to detect, for example, the sight-line direction based on the light receiving signal obtained by the light receiving unit. Alternatively, for example, the system controller 211 may be configured to detect thicknesses of crystalline lens of the user based on the light receiving signal obtained as the electrical signal through the conversion of the reflected light that is received by the light receiving unit. In other words, the sensor unit 221 may include a sight-line detection unit configured to detect the sight lines of the user. Note that, how the sight lines are detected is not particularly limited.

The sensor control unit 222 is configured to control the sensors in response to instructions from the system controller 211, specifically, control at which timing which of the sensors is driven, by what kind of driving method the detection is performed, and the like. Further, the sensor signal processing unit 223 is configured to execute various numerical computations such as mean and variance as pre-processes on the sensor signals that are detected by the sensor unit 221 prior to transmission to the system controller 211 side.

The transmissive HMD 100 may need operations by the user so as, for example, to perform power-on/off, start or end display of various information images, change image contents, perform display control such as luminance level control and color tone control, and change display area of a display screen. Specifically, for receiving those operations (detecting triggers for processing operations), the sensor unit 221 may include a controller such as operation keys and an operation dial to be operated by the user, and an operation detection mechanism configured to detect operations to the controller so that the sensor unit 221 can detect those operations by the user.

Instead of provision of such a controller, the system controller 211 may be configured to determine operating intention of the user or appropriate operation processes based on conditions of the user (such as movements of the eyes and behavior or conditions of the body), which are detected by the sensors of the sensor unit 221, and to execute the processes in accordance therewith.

Further, the sensor unit 221 may be configured to detect other external information items (such as detected information items of environmental conditions of the transmissive HMD 100, locations, dates, and conditions of a photographic subject). The system controller 211 may be configured to determine appropriate operation processes based on the external information items detected by the sensor unit 221, and to execute those processes.

Further, the transmissive HMD 100 includes an image generating unit 231, a display-image processing unit 232, a display drive unit 233, and a display control unit 234.

The image generating unit 231 is configured to generate image signals under control by the system controller 211. The system controller 211 causes the image generating unit 231 to generate the image signals to be converted to images that are presented to the user in accordance with contents or numerical values obtained from the units. In this way, picture images, graph images, letter images, or images of warning to the user are generated.

The display-image processing unit 232 includes what is called a video processor, and is configured to execute various display processes on the supplied image signals. For example, the display-image processing unit 232 performs luminance level adjustment, color correction, contrast adjustment, sharpness (edge enhancement) adjustment of image pickup signals supplied from an image pickup signal processing unit 252. Further, the display-image processing unit 232 may make settings of display positions on the display. Still further, the display-image processing unit 232 may perform, for example, generation of an enlarged image of a part of the image pickup signals, or generation of a downsized image thereof, soft focus, mosaicing, luminance inversion, highlighting (emphatic display) of a part of the images, image effect processes such as variation of an atmosphere of the entire color, image separation or synthesis for split display of captured images, a process of generating character images and picture images, and a process of synthesizing the generated images into the captured images. The display-image processing unit 232 supplies the image signals obtained through those signal processes to the display drive unit 233.

Note that, the display-image processing unit 232 may be configured to execute such processes in response to instructions issued by the display control unit 234, or to the sensor signals supplied from the sensor signal processing unit 223. Further, the display-image processing unit 232 may be configured to execute the same processes on images supplied from the display control unit 234. Specifically, the display-image processing unit 232 may be configured to execute the signal processes, which are necessary for displaying, also on the image signals generated in the image generating unit 231 and supplied to the display-image processing unit 232, and then supply those image signals to the display drive unit 233.

The display drive unit 233 includes a pixel drive circuit configured to display the image signals supplied from the display-image processing unit 232 on the display unit 112. Specifically, the display drive unit 233 is configured to perform display by applying drive signals to pixels arranged in matrix in the display unit 112 at predetermined horizontal/vertical drive timings based on video signals. Further, the display drive unit 233 may be configured to display a part of or the entire screen in a through mode by controlling luminances of the pixels of the display unit 112.

The display control unit 234 is configured to control, in response to the instructions from the system controller 211, the processing operations in the display-image processing unit 232, operations in the display drive unit, and images to be displayed on the left and right display units, and to instruct the display-image processing unit 232 to execute the signal processes. Further, the display control unit 234 is configured also to cause the display drive unit 233 to switch the through mode, an image display mode, and monocular display mode to each other.

Further, the transmissive HMD 100 includes a sound generating unit 241, an audio output unit 242, an audio input unit 243, and a sound signal processing unit 244.

The sound generating unit 241 is configured, for example, to generate sound signals such as a voice message, and to generate sound signals such as electronic sound to be presented to the user by executing a voice synthesis process in response to the instructions from the system controller 211.

The audio output unit 242 includes speakers or earphone speakers mounted to the transmissive HMD 100, and an amplifier circuit for those speakers. The sound signals generated by the sound generating unit 241 are supplied to the audio output unit 242. With this, the voice message, the electronic sound, and the like are audible to the user. Note that, examples of the audio output unit 242 may include what is called a bone-conduction speaker.

The audio input unit 243 includes a microphone amplifier unit configured to execute an amplification process on sound signals obtained via a microphone, and an A/D converter, and is configured to output audio data.

The audio signal processing unit 244 includes a digital signal processor and a D/A converter. The audio data obtained via the audio input unit 243 and the audio data generated by the sound generating unit 241 are supplied to the audio signal processing unit 244. The audio signal processing unit 244 is configured to execute processes such as volume control, tone control, and sound effects on the supplied audio data under the control by the system controller 211. Then, the processed audio data is converted to an analog signal by the audio signal processing unit 244, and supplied to the audio output unit 242. Note that, the audio signal processing unit 244 needs not necessarily be configured to execute the digital signal process, and may be configured to execute signal processes through an analog amplifier or an analog filter.

The sound signals output from the audio signal processing unit 244 are output as sound from the earphone speakers of the audio output unit 242. With such a configuration, external sound collected by the audio input unit 243, or the sound generated by the sound generating unit 241 are audible to the user.

Further, the transmissive HMD 100 includes an imaging unit 251, the image pickup signal processing unit 252, and an imaging control unit 253.

The imaging unit 251 includes a lens system including an imaging lens, an aperture, a zoom lens, a focus lens, and the like. The imaging unit 251 also includes a drive system configured to cause the lens system to perform a focusing operation or a zooming operation. The imaging unit 251 also includes a solid-state image pickup element array configured to detect image pickup light obtained through the lens system, and to generate image pickup signals through photoelectric conversion. Examples of the solid-state image pickup element array include a CCD (Charge Coupled Device) sensor array and a CMOS (Complementary Metal Oxide Semiconductor) sensor array.

The imaging unit 251 is configured to image a scene in front of the user (photographic subject in the real space in front of the user) through, for example, the hole 113. As a matter of course, the imaging unit 251 may be configured also to image scenes in other directions, such as a scene behind the user.

The image pickup signal processing unit 252 includes a sample-and-hold/AGC (Automatic Gain Control) circuit configured to perform gain control or wave pattern reshaping on the signals obtained by the solid-state image pickup element of the imaging unit 251, and a video A/D converter. With this, the image pickup signals as digital data are obtained. Further, the image pickup signal processing unit 252 may be configured also to execute a white-balance process, a luminance process, a color signal process, a blur correcting process, and the like on the image pickup signals.

The imaging control unit 253 is configured to control operations of the imaging unit 251 and the image pickup signal processing unit 252 in response to the instructions from the system controller 211. Specifically, the imaging control unit 253 controls on/off of the operations of the imaging unit 251 and the image pickup signal processing unit 252. Further, the imaging control unit 253 performs control (motor control) for causing the imaging unit 251 to perform operations such as automatic focusing, automatic exposure adjustment, aperture adjustment, zooming in/out, and focus change.

Note that, in a case where a movable mechanism capable of changing a photographic subject direction with respect to an imaging lens is provided, the imaging control unit 253 varies a direction of the imaging lens of the imaging unit 251 by controlling operation of the movable mechanism in response to the instructions from the system controller 211.

Further, the imaging control unit 253 includes a timing generator configured to generate timing signals. In response to those timing signals, signal processing operations of the solid-state image pickup element of the imaging unit 251, and the sample-and-hold/AGC circuit and the video A/D converter of the image pickup signal processing unit 252 are performed. Further, this timing control also enables variable control of an imaging frame rate.

Further, the imaging control unit 253 may be configured also to control imaging sensitivities and signal processes in the solid-state image pickup element of the imaging unit 251 and the image pickup signal processing unit 252. Specifically, the imaging control unit 253 may perform, as imaging sensitivity control, gain control of signals to be read out from the solid-state image pickup element of the imaging unit 251, black level setting control, control of various coefficients in processes on the image pickup signals in a form of digital data, control of a correction amount in the blur correcting process, and the like.

Still further, the imaging control unit 253 may be configured also to perform control such as overall sensitivity adjustment irrespective of wavelength bands, and adjustment of imaging sensitivities in particular wavelength bands such as an infrared region and an ultraviolet region (specifically, imaging in which particular wavelength bands are excluded). More specifically, the sensitivity adjustment in accordance with the wavelengths can be performed by insertion of wavelength filters in the imaging lens system and wavelength filter calculation processes on the image pickup signals. In those cases, the imaging control unit 253 is capable of performing sensitivity control, for example, by controlling the insertion of the wavelength filters, or by specifying filter calculation coefficient.

For example, captured image signals obtained by the imaging unit 251 and the image pickup signal processing unit 252 are supplied to the display-image processing unit 232 together with the information image signals generated in the image generating unit 231. The display-image processing unit 232 executes not only the above-mentioned various signal processes on the image signals, but also an image-split signal process (image synthesis process) on the image signals of those two types so that images are displayed at once on the display unit 112.

The image signals that have been subjected to the synthesis process in the display-image processing unit 232 are supplied to the display drive unit 233, and then displayed on the display unit 112. With this, on the display unit 112, the captured images and images of other types are displayed at once. In other words, other various images are visible to the user who is watching the captured images.

In order to start or end an image pickup operation, perform the zooming operation and the focusing operation, or perform adjustment of the captured image, and the like, operations by the user may be needed. As a matter of course, the operations by the user may be needed, for example, also to perform power-on/off, start or end display of various information images, change image contents, perform display control such as luminance level control and color tone control, and change display areas on a display screen. Specifically, for receiving those operations (detecting triggers of the operations), the sensor unit 221 may include a controller such as operation keys. Alternatively, the system controller 211 may be configured to determine operating intention of the user or appropriate operation processes based on the conditions of the user (such as movements of the eyes and behavior or conditions of the body), which are detected by the various sensors of the sensor unit 221, and to execute the processes in accordance therewith.

Further, the sensor unit 221 may be configured to be capable of detecting external information items (detected information items such as environmental conditions of the transmissive HMD 100, locations, dates, and conditions of a photographic subject). The system controller 211 may be configured to determine appropriate operation processes based on the external information items, and to execute those processes.

Further, the transmissive HMD 100 includes a storage unit 261, a communication unit 262, and a drive 263.

The storage unit 261 includes arbitrary storage media such as solid-state memories including a HDD (Hard Disk Drive) and a flash memory, a memory card incorporating the solid-state memories, an optical disk, an a magneto-optical disk, and a holographic memory, and is configured to a record/reproduce data that is stored in those storage media.

Specifically, the data of images captured by the imaging unit 251 and processed into the image pickup signals by the image pickup signal processing unit 252, image data received via the communication unit 262, and the various information image signals generated by the image generating unit 231 may be stored to the storage unit 261. Further, the audio data obtained via the audio input unit 243, audio data received via the communication unit 262, and the audio data generated in the sound generating unit 241 also may be stored to the storage unit 261.

The storage unit 261 executes an encoding process on the supplied image data and the supplied audio data under the control by the system controller 211 so that those data items can be stored to the storage media, and then stores those encoded data items (encoded data items) to the storage media. Further, under the control by the system controller 211, the storage unit 261 reproduces the image data and the audio data from the storage media, and outputs those data items to other processing units.

Examples of the data to be reproduced in the storage unit 261 include every kind of data items to be displayed, specifically, moving-image content items such as a movie and a video clip, still-image content items captured by a digital still camera and the like and recorded to the recording media, data of electronic books and the like, image data generated using a personal computer and the like by the user, text data, computer use data such as spreadsheet data, and game images.

The communication unit 262 is configured to exchange data with respect to apparatus that are external to the transmissive HMD 100 (also referred to as external apparatus). Examples of the external apparatus include a camcorder, an imaging apparatus such as a digital still camera, a computer apparatus, a smartphone, a smartwatch, AV apparatus such as a video storage apparatus and a television set, and a network server apparatus each having a communication function.

Further, network communication may be performed, for example, via a short-distance wireless communication between network access points with a predetermined system such as a wireless LAN (Local Area Network) and Bluetooth (trademark). Alternatively, direct wireless communication may be performed between external apparatus having a common communication function.

In a case where the external apparatus is an imaging apparatus, data of images captured by the imaging apparatus may be sent from the external apparatus to the transmissive HMD 100. In a case where the external apparatus is a content source apparatus, every kind of data items to be displayed, specifically, moving-image content items such as a movie and a video clip, still-image content items captured by a digital still camera and the like and recorded to the recording media, data of electronic books and the like, image data generated using a personal computer and the like by the user, text data, computer use data such as spreadsheet data, and game images may be sent from the external apparatus to the transmissive HMD 100.

Further, the audio data obtained via the audio input unit 243, audio data reproduced in the storage unit, the audio data received via the communication unit 262 are supplied to the audio signal processing unit 244 in response to the instructions from the system controller 211.

Thus, while wearing the device, the user can view the captured images and listen to the external sound that is recorded at the time of capturing, view the images and listen to the sound that are reproduced in the storage unit, and view the images and listen to the sound that are received via the communication unit 262.

In particular, the images generated in the image generating unit 231 are supplied to the display-image processing unit 232 together with the captured images, the reproduced images, or the received images. Thus, the various information images are displayed together with the captured images, the reproduced images, or the received images.

Further, when the audio data is generated in the sound generating unit 241 and supplied at the same timing to the audio signal processing unit 244, the voice message and alarm generated in the sound generating unit 241 are audible under a state in which the external sound, the reproduced sound, the received sound, and the like are reproduced.

The system controller 211 needs to determine not only operations of the display system and the imaging function but also triggers of controlling operations of play, cue, fast-forward reproduction/fast-reverse reproduction, pause, and recording in the storage unit 261, and controlling operations of data exchange in the communication unit 262. Also in this case, the controller such as operation keys to be operated by the user may be provided, for example, to the sensor unit 221 so that processes in response to the operations may be executed. Further, the system controller 211 may be configured to determine operating intention of the user or appropriate operation processes from the conditions of the user (such as movements of the eyes and behavior or conditions of the body), which are detected by the sensor unit 221, and to execute the processes in accordance therewith.

Still further, the sensor unit 221 may be configured to be capable of detecting external information items of the transmissive HMD 100 (detected information items such as environmental conditions of the display apparatus, locations, dates, and conditions of a photographic subject). The system controller 211 may be configured to determine appropriate operation processes based on the external information items, and to execute those processes.

Removable media 264 such as an optical disk and a semiconductor memory are mounted as appropriate to the drive 263. Computer programs and data that are read out from the removable media 264 via the drive 263 are supplied to the system controller 211, and then stored or installed to the storage unit 261.

In the transmissive HMD 100 configured as described above, the display unit 112 transmits, as described above, the light from the rear surface side of the display unit 112 (front of the display unit 112 as viewed from the user), and displays images to be viewed from a plurality of viewpoints as a three-dimensional image (display object) in a superimposed manner on a scene in the real space on the rear surface side thereof.

Further, the image generating unit 231 generates the left-eye image and the right-eye image as the three-dimensional image (display object) to be displayed on the display unit 112.

Further, the display control unit 234 causes a plurality of the three-dimensional images (display objects) generated by the image generating unit 231 to be displayed on the display unit 112 in a manner that the plurality of three-dimensional images are arranged in a plurality of lines that are different from each other in position in the depth direction on the near side with respect to the scene in the real space.

Specifically, the display control unit 234 sets virtual-image positions of the display objects to desired positions on the near side with respect to the scene in the real space as viewed from the user. In other words, the display control unit 234 sets those virtual-image positions of the display objects to form the plurality of lines that are different from each other in position in the depth direction on the near side with respect to the scene in the real space.

Next, the display control unit 234 controls the display-image processing unit 232 so as to reflect (apply) the settings to the display objects generated by the image generating unit 231. In other words, the display-image processing unit 232 assigns the virtual-image positions set by the display control unit 234 to the display objects.

Then, the display control unit 234 controls the display unit 112 through intermediation of the display drive unit 233 so as to display the display objects to which the virtual-image positions are assigned by the display-image processing unit 232.

In order to set such virtual-image positions of the display objects, the display control unit 234 may be configured to set binocular parallax and a convergence angle of each of the display objects. In that case, a method of adjusting (setting) the binocular parallax and the convergence angles is not particularly limited. For example, the three-dimensional display apparatus disclosed in Japanese Patent Application Laid-open No. H08-322004 includes a system configured to shift a video electrically displayed in a display plane in a horizontal direction so that a convergence angle substantially matches a diopter scale in real time. Further, the three-dimensional-video reproducing apparatus disclosed in Japanese Patent Application Laid-open No. H08-211332 is configured to obtain a three-dimensional video by using binocular parallax, and includes a convergence angle selection section configured to set a convergence angle at the time when a reproduced video is watched, and a control section configured to control relative reproduction positions of the left and right videos based on information of a selected convergence angle. For example, the display control unit 234 may be configured to set parallax and the convergence angle of each of the display objects by using the methods according to those technologies.

Note that, in order to emphasize a sense of depth of the display objects, a predetermined display control process may be executed in accordance with their virtual-image positions (positions in the depth direction). Specifically, in accordance with the virtual-image positions (positions in the depth direction) of the display objects, the display objects may be changed in size, value, chroma, and contrast. An interval between the display objects may be changed in each line. Superimposition of the display objects aligned near and far in the depth direction may be expressed. The display objects may be changed in hue. Alternatively, the display objects may be changed in degree of focusing. As a matter of course, display control processes other than those in the above-mentioned examples may be executed, or processes of a plurality of types may be executed.

In that case, in accordance with the virtual-image positions of the display objects, the display control unit 234 makes settings of details of the display control process to be executed on the display objects. For example, in a case where a process of controlling the sizes of the display objects is executed, the display control unit 234 sets the sizes of the display objects based on the virtual-image positions of the display objects. Then, the display control unit 234 controls the display-image processing unit 232 so as to reflect (apply) the settings to the display objects generated by the image generating unit 231. In other words, the display-image processing unit 232 adjusts the sizes of the display objects generated by the image generating unit 231 to the sizes set by the display control unit 234.

In this way, when the predetermined display control process of emphasizing the sense of depth is executed on the display objects, the sense of depth of the display objects can be matched with the sense of perspective in the real space. With this, images to be viewed by the user are displayed in a visually natural state in a display area of the display unit 112. As a result, a sense of discomfort to the user can be reduced. Further, this process allows the user to more easily grasp differences in position between the lines of the display objects. With this, operability of the transmissive HMD 100 can be further enhanced.

The processes in the above-mentioned units are executed under the control by the system controller 211. In other words, as in the case of the image display apparatus described in the first embodiment, the system controller 211 allows the real space to be transparently viewed, and displays the plurality of display objects on the display unit 112 that is configured to display three-dimensional images in a manner that the plurality of display objects are arranged in a plurality of lines that are different from each other in position in the depth direction on the near side with respect to the real space.

(Display Example of Display Objects)

Figure 4:
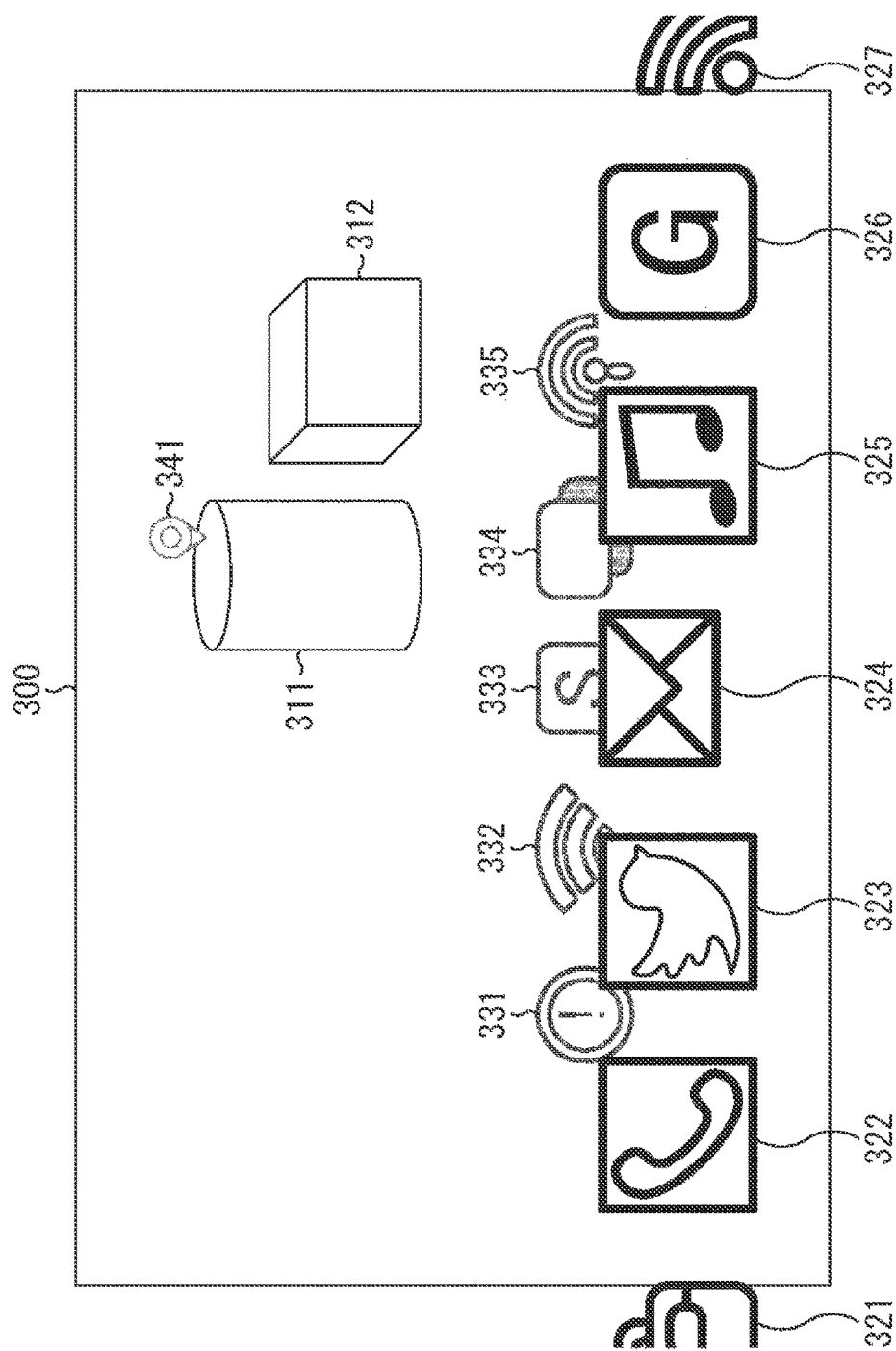
FIG. 4 is a view of a display example of display objects.

FIG. 4 illustrates a display example of the display objects that are displayed as described above. A quadrangular frame 300 illustrated in FIG. 4 is an angular field within the display area of the display unit 112 at the time of the imaging by the imaging unit 251. This quadrangular frame 300 may be or need not be displayed on the display unit 112.

Physical objects 311 and 312 illustrated in FIG. 4 are physical objects in the real space, which exist on a depth side with respect to the display unit 112 as viewed from the user. As illustrated in FIG. 4, on the display unit 112, the display objects that are images such as menu icons (display objects 321 to 327 and display objects 331 to 335) are displayed in a manner of being superimposed on a scene in the real space including these physical objects.

Different roles (functions) are assigned respectively to the display objects. For example, there may be displayed a display object having a function of a GUI to be selected by the user so that a predetermined process assigned in advance thereto, such as activation of an application, is executed. Alternatively, there may be displayed a display object that notifies reception of e-mails, or a display object having a notification function to notify radio wave receiving conditions of wireless communication.

Further, these display objects are three-dimensional images each formed of a right-eye image and a left-eye image that have binocular parallax and a convergence angle therebetween. In other words, these display objects each have a virtual-image position in the depth direction (displayed in a manner of existing at predetermined positions in the depth direction). In still other words, depending on settings of the binocular parallax and the convergence angle, these display objects can be displayed at desired virtual-image positions (displayed in a manner of existing at desired positions in the depth direction as viewed from the user).

In the example of FIG. 4, these display objects (display objects 321 to 327, and display objects 331 to 335) are displayed in a manner of existing on the near side with respect to the real space as viewed from the user. In other words, virtual-image positions of these display objects are set on the near side with respect to the real space as viewed from the user.

Further, the virtual-image positions (positions in the depth direction) of the display objects 321 to 327 are aligned with each other. Similarly, the virtual-image positions (positions in the depth direction) of the display objects 331 to 335 are aligned with each other. Thus, as illustrated in FIG. 4, the display objects 321 to 327 are displayed in a manner of being arrayed in a single horizontal line as viewed from the user. Similarly, the display objects 331 to 335 are also displayed in a manner of being arrayed in a single horizontal line as viewed from the user.

Meanwhile, the virtual-image positions of the display objects 321 to 327 are set on the near side with respect to the virtual-image positions of the display objects 331 to 335 as viewed from the user. In other words, the virtual-image positions of the display objects 331 to 335 are set on the depth side with respect to the virtual-image positions of the display objects 321 to 327 as viewed from the user. In still other words, as illustrated in FIG. 4, a plurality of display objects are displayed in a manner of being arranged in a plurality of lines that are different from each other in position in the depth direction as viewed from the user.

Figure 5:
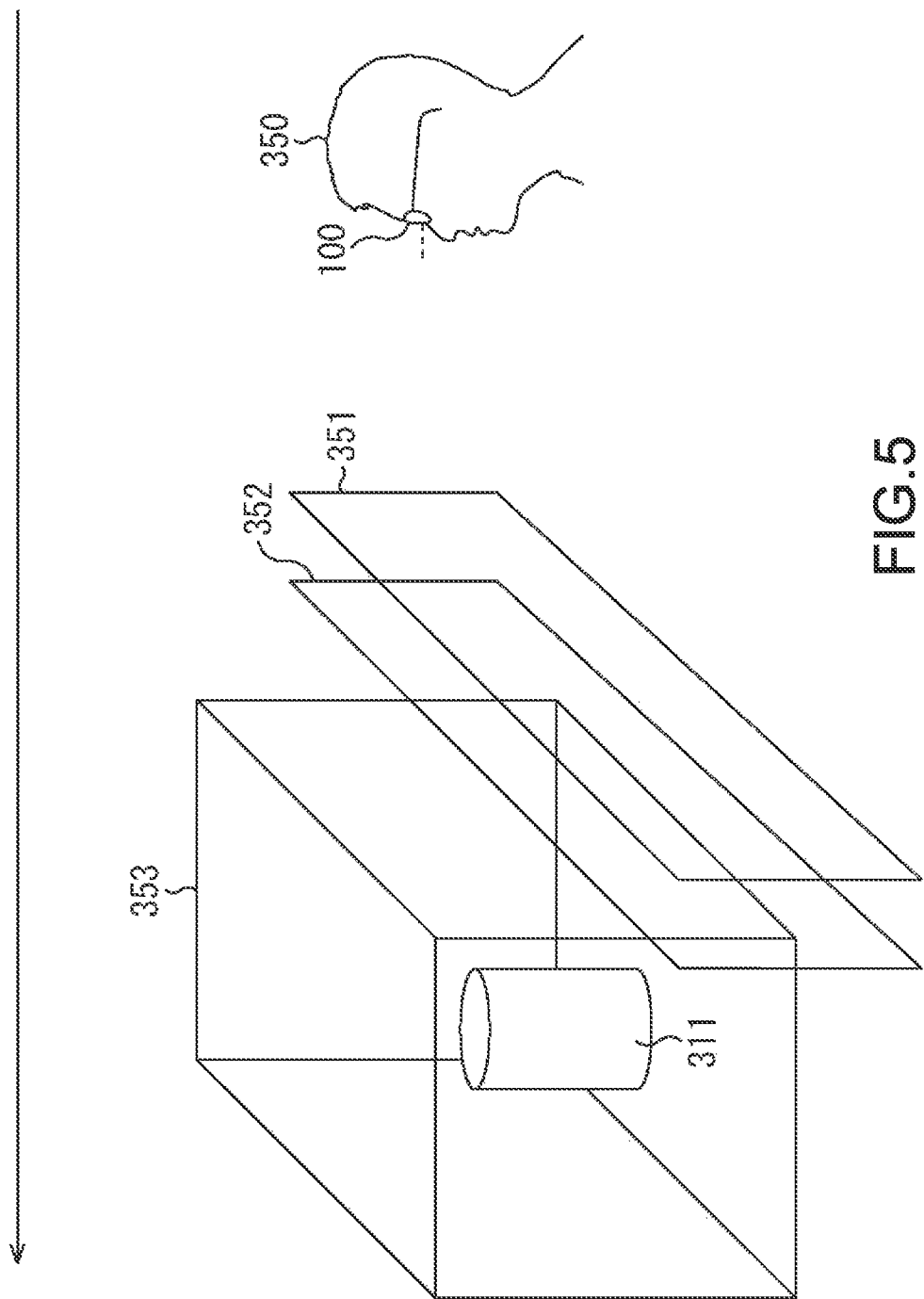
FIG. 5 is a view of an example of a hierarchical arrangement of the display objects.

FIG. 5 illustrates an example of such a positional relationship between the virtual-image positions. Specifically, as illustrated in the example of FIG. 5, as viewed from a user 350 of the transmissive HMD 100, the display objects 331 to 335 are displayed in a single horizontal line in a layer 352 at a predetermined position on a near side with respect to a real space 353 in front of the user 350. The display objects 321 to 327 are displayed in a single horizontal line in a layer 351 at a predetermined position on a near side with respect to the layer 352.

In this way, when a plurality of objects are displayed on the near side with respect to the real space in a manner of being arranged in a plurality of lines that are different from each other in position in the depth direction, the user can view the plurality of display objects that are arranged in order in each of the lines, and hence can more easily searched for or select target objects. In this way, the operability of the transmissive HMD 100 can be enhanced.

Note that, the layers of the display objects are not particularly limited in number, and the display objects may be arrayed in three or more layers. Further, as long as virtual-image positions (positions in the depth direction) of the display objects are aligned with each other, the display objects are not particularly limited in arrangement. The display objects may be arrayed not only in the horizontal direction, but also in a vertical direction, an oblique direction, or other arbitrary directions. Alternatively, the display objects may be arrayed in still other arbitrary patterns such as a circular pattern, a radial pattern, and a matrix.

Further, in the example of FIG. 4, a marker is added to the physical object 311 in the real space, and a display object 341 as the marker is displayed. This display object 341 is added to the physical object 311 in the real space, and hence, in the example of FIG. 5, is displayed in a manner of existing in the real space 353 (substantially at the same position as that of the physical object 311). In other words, this display object 341 is displayed at a position on the depth side as viewed from the user with respect to both the above-mentioned display objects 321 to 327 and the above-mentioned display objects 331 to 335.

The display objects 321 to 327, and the display objects 331 to 335 are linked to the user 350 (transmissive HMD 100) (local coordinates). Thus, when global coordinates of the transmissive HMD 100 (display unit 112) vary (move), global coordinates of those display objects vary in accordance therewith. Note that, relative coordinates (local coordinates) of those display objects with respect to the transmissive HMD 100 (display unit 112) remain unchanged (are displayed at the same positions in the display unit 112 also after the movement).

Meanwhile, the display object 341 is linked to the physical object 311 (global coordinates) in the real space 353. Thus, even when the global coordinates of the transmissive HMD 100 (display unit 112) vary (move), global coordinates of the display object 341 remain unchanged (are displayed near the physical object 311 as prior to the movement). Note that, relative coordinates (local coordinates) of the display object 341 with respect to the transmissive HMD 100 (display unit 112) vary, and hence the display object 341 after the movement is not necessarily displayed on the display unit 112 (as long as the physical object 311 is displayed, the display object 341 is displayed aside).

Note that, in the example of FIG. 4, the display objects 321 to 327 may be displayed beyond an imaging range (quadrangular frame 300). Further, in the above description, seven display objects are displayed in the line on the near side as viewed from the user, and five display objects are displayed in the line on the depth side as viewed from the user. However, the number of the display objects in each of the lines is not particularly limited.

Further, the lines (layers) in which the display objects are arranged may be controlled in accordance with the roles (functions) represented by images of the display objects. For example, as in the case of FIG. 4, display objects of a group of icons (group of icons for instructing execution of processes such as making a phone-call and checking e-mails) that can be controlled (selected) by the user are arranged in the line on the near side as viewed from the user (layer 351). Display objects of a group of interrupt icons relating to the user (group of icons for notifying update of SNS or reception of new e-mails) are arranged in the line on the depth side as viewed from the user (layer 352). Display objects of navigation icons or markers linked to the physical objects in the real space (such as physical object 311) may be arranged in the real space 353.

In this way, when the display objects are sorted according to type and arrayed in corresponding lines in the depth direction, the user can more easily search for or select target objects. In this way, the operability of the transmissive HMD 100 can be enhanced.

(Flow of Display Control Process)

Figure 6:
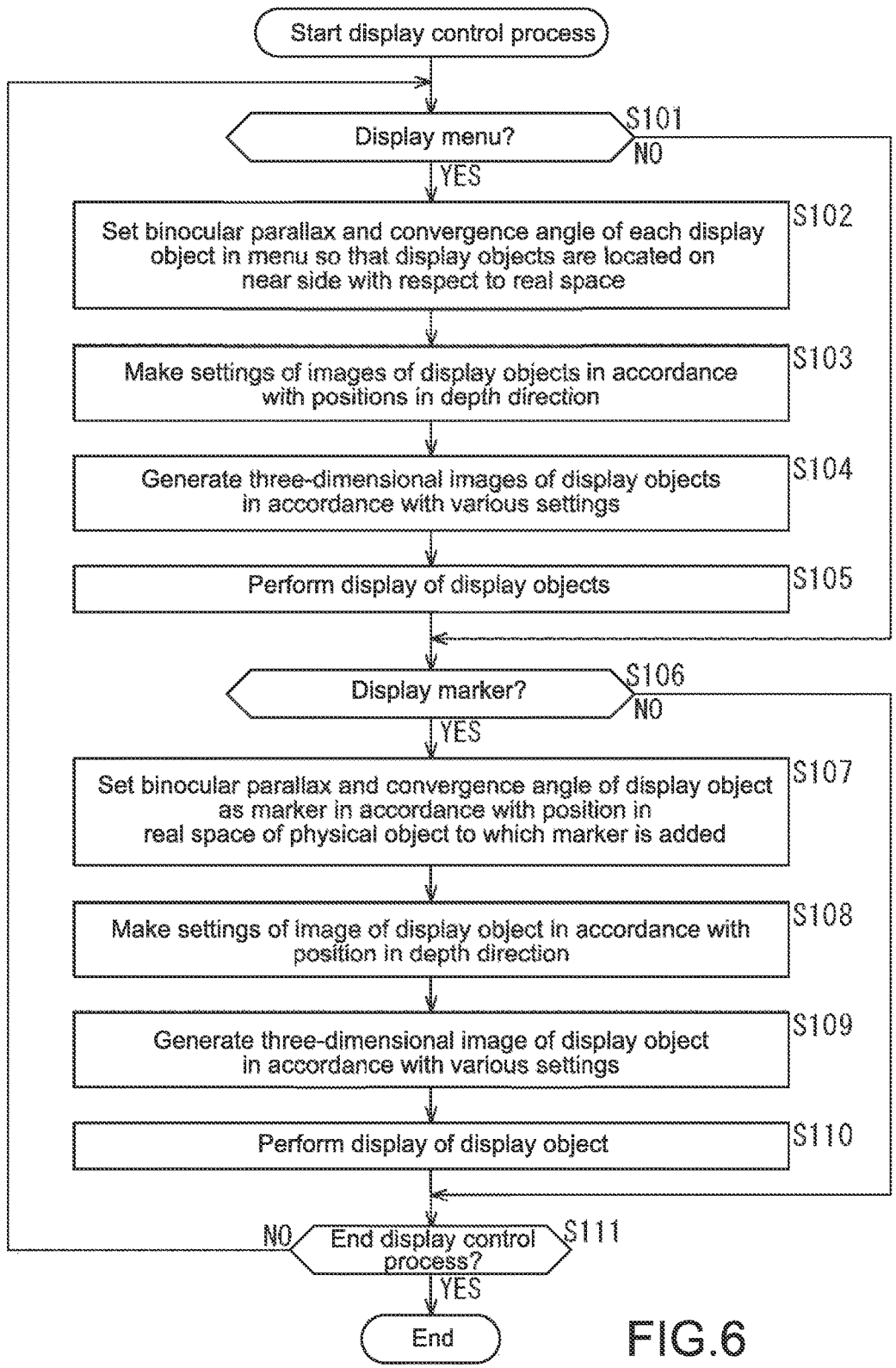
FIG. 6 is a flowchart showing an example of a flow of a display control process.

The system controller 211 of the transmissive HMD 100 executes the display control process so that the display objects are displayed as described above. Description is made of an example of a flow of this display control process with reference to the flowchart of FIG. 6.

When this display control process is started, in Step S101, the system controller 211 determines whether or not to display a menu. For example, when the system controller 211 determines to display the menu in response, for example, to acceptance of an instruction, for example, from the user, or through satisfaction of a predetermined condition, the system controller 211 advances the flow to Step S102.

In Step S102, the system controller 211 controls the display control unit 234 so that virtual-image positions of display objects in the menu are located on a near side with respect to a real space. Specifically, in order to set the virtual-image positions of the display objects, binocular parallax and a convergence angle of each of the display objects are set by the display control unit 234 under the control by the system controller 211.

Figure 7C:
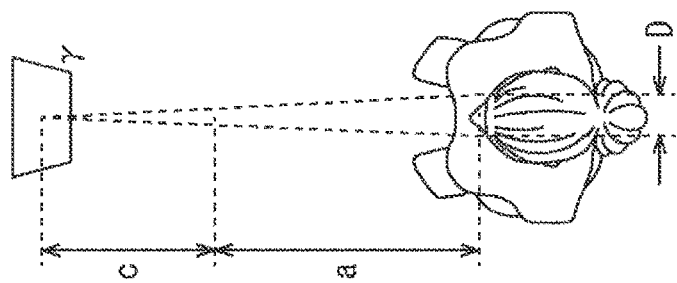
FIGS. 7A-7C are explanatory views of binocular parallax and a convergence angle.
Figure 7B:
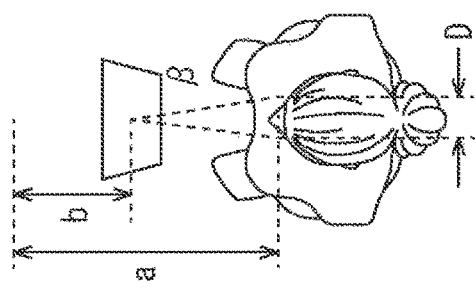
Figure 7A:
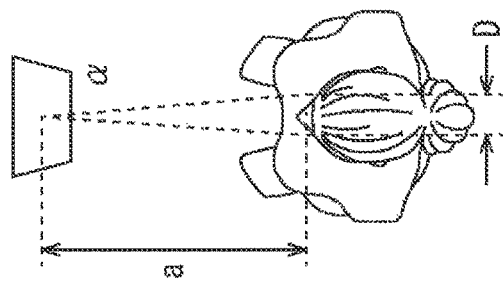

In this context, description is made of a general computation method for the convergence angle. For example, as illustrated in FIG. 7A, a convergence angle α is formed when the user (transmissive HMD 100) is away from a virtual-image position of a display object (also referred to as virtual-image distance) by a distance "a." As illustrated in FIG. 7B, a convergence angle β is formed when the display object comes closer from the position at the virtual-image distance "a" to a position at a virtual-image distance b. As illustrated in FIG. 7C, a convergence angle Y is formed when the display object moves away from the position at the virtual-image distance "a" to a position at a virtual-image distance c. The left and right pupils are separated away from each other by a distance D.

When D is 61.5 mm and "a" is 4,000 mm, α is 53 minutes. In a case where one pixel in the display unit 112 corresponds to 3 minutes, when an image display position is shifted inward from a predetermined position in the horizontal direction by an amount corresponding to one pixel, β is 56 minutes, and b is 225 mm.

Meanwhile, when the image display position in the display unit 112 is shifted outward from a predetermined position in the horizontal direction by the amount corresponding to one pixel, Y is 50 minutes, and c is 228 mm. In this way, the convergence angle varies in accordance with the image display position, and hence the virtual-image distance (in other words, virtual-image position) of the display object can be arbitrarily changed.

By using, for example, such a method, the display control unit 234 sets the binocular parallax and the convergence angle of each of the display objects. As a matter of course, the method of setting the binocular parallax and the convergence angle of each of the display objects is not particularly limited, and methods other than that in the above-mentioned example may be employed.

In Step S103, the system controller 211 controls the display control unit 234 so that settings are made on the predetermined display control process of emphasizing the sense of depth of the display objects, which is executed on the display objects in accordance with positions in the depth direction. Note that, detailed description of this display control process is made below.

In Step S104, the system controller 211 controls the image generating unit 231 and the display-image processing unit 232 through intermediation of the display control unit 234 so that display objects (three-dimensional images) are generated in accordance with the various settings made in Steps S102 and S103.

In Step S105, the system controller 211 controls the display drive unit 233 and the display unit 112 through intermediation of the display control unit 234 so that the display objects generated in Step S104 are displayed on the display unit 112.

When the process of Step S105 is ended, the flow proceeds to Step S106. Further, in Step S101, when the system controller 211 determines not to display the menu, for example, in a case where the instruction, for example, from the user has not yet been accepted, or a case where the predetermined condition has not yet been satisfied, the flow proceeds to Step S106.

In Step S106, the system controller 211 determines whether or not to display a marker. For example, when the system controller 211 determines to display the marker, for example, in a case where a physical object in the real space, to which a marker is added, is located in the display area of the display unit 112, the system controller 211 advances the flow to Step S107.

In Step S107, the system controller 211 controls the display control unit 234 so that, as in the process of Step S102, a virtual-image position of the display object as the marker is set in accordance with positions in the real space of the physical object to which the marker is added. Specifically, in order to set a virtual-image position of the physical object to which the marker is added, binocular parallax and a convergence angle of the display object as the marker are set by the display control unit 234 under the control by the system controller 211.

In Step S108, as in Step S103, the system controller 211 controls the display control unit 234 so that settings are made on the predetermined display control process of emphasizing the sense of depth of the display object, which is executed on the display object in accordance with positions in the depth direction.

In Step S109, as in the case of Step S104, the system controller 211 controls the image generating unit 231 and the display-image processing unit 232 through intermediation of the display control unit 234 so that the display object (three-dimensional image) is generated in accordance with the various settings made in Steps S107 and S108.

In Step S110, the system controller 211 controls the display drive unit 233 and the display unit 112 through intermediation of the display control unit 234 so that, as in Step S105, the display object generated in Step S109 is displayed on the display unit 112.

When the process of Step S110 is ended, the flow proceeds to Step S111. Further, in Step S106, when the system controller 211 determines not to display the marker, for example, in a case where the physical object in the real space, to which the marker is added, is located out of the display area of the display unit 112, the flow proceeds to Step S111.

In Step S111, the system controller 211 determines whether or not to end the display control process. When the system controller 211 determines not to end the display control process, the flow returns to Step S101, and the subsequent processes are repeated. Further, in Step S111, when the system controller 211 determines to end the display control process, the display control process is ended.

When the sensor unit 221 executes the display control process in this way, the operability of the transmissive HMD 100 can be enhanced. Further, the processes of Steps S103 and S108 enable, for example, the sense of depth of the display objects to be matched with the sense of perspective in the real space. With this, images to be viewed by the user are displayed in a visually natural state in the display area of the display unit 112. As a result, the sense of discomfort to the user can be reduced. Further, those processes allow the user to more easily grasp differences in position between the lines of the display objects. With this, the operability of the transmissive HMD 100 can be further enhanced.

(Size)

Next, description is made of an example of the display control in Steps S103 and S108 in the display control process described above, which is executed on the display objects.

As an example of this display control process, the sizes of the display objects may be controlled in accordance with the virtual-image positions of the display objects (specifically, in accordance with the positions in the depth direction of the lines in which the display objects are arranged). More specifically, display objects at virtual-image positions on a nearer side as viewed from the user may be displayed on a larger scale. In other words, display objects at virtual-image positions on a deeper side may be displayed on a smaller scale.

Figure 8:
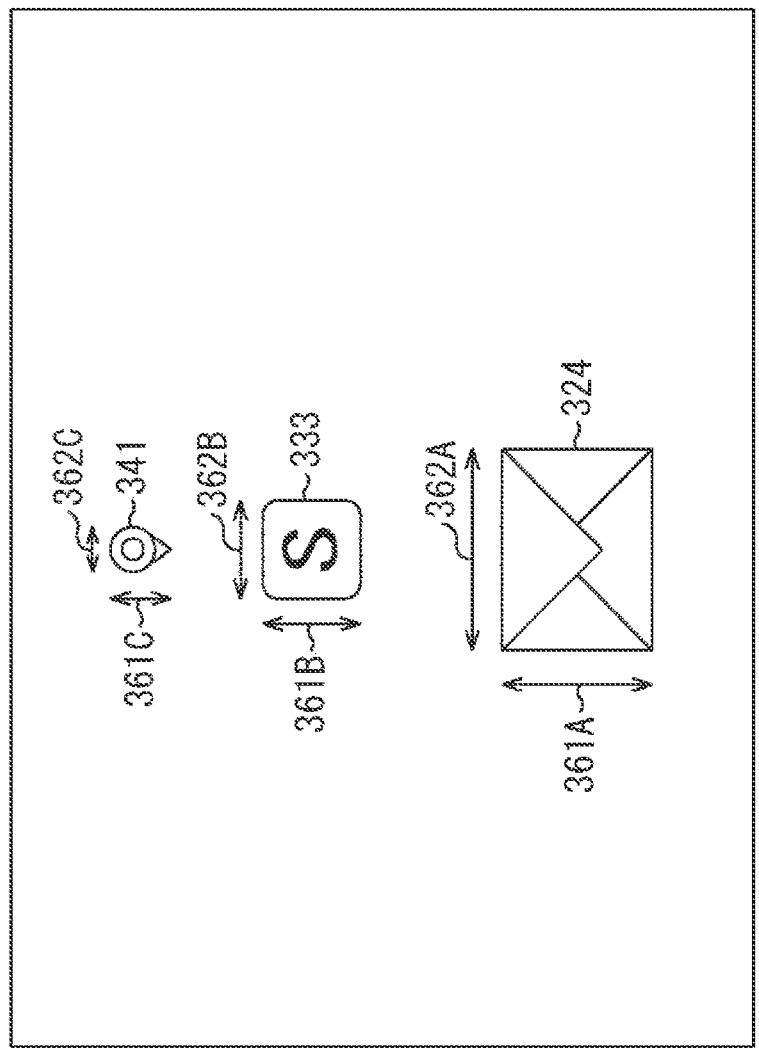
FIG. 8 is a view of another display example of the display objects.

FIG. 8 illustrates this example. In the case of the example of FIG. 8, display objects 324 and 333, and the display object 341 are displayed on the display unit 112. As indicated by double-headed arrows 361A to 361C, and by double-headed arrows 362A to 362C, the display object 324 at a virtual-image position on the nearest side as viewed from the user is displayed on the largest scale, the display object 333 at a virtual-image position on the second nearest side as viewed from the user is displayed on the second largest scale, and the display object 341 at a virtual-image position on the deepest side as viewed from the user is displayed on the smallest scale.

In order to perform such display control, for example, it is only necessary to cause the system controller 211 to control the display control unit 234 so that the sizes of the display objects are set in accordance with the virtual-image positions thereof, and to control the display-image processing unit 232 so that sizes of display objects generated by the image generating unit 231 are set to be equal to the sizes set by the display control unit 234 (in other words, settings made by the display control unit 234 are reflected (applied) to the display objects generated by the image generating unit 231).

With this, the sense of depth of the display objects can be emphasized, and the operability of the transmissive HMD 100 can be further enhanced.

Note that, the differences in size between the display objects may be expressed in proportion to distances from the transmissive HMD 100 to the virtual-image positions (virtual-image distances), or may be varied in accordance with the virtual-image distances. Specifically, the sizes of the display objects may be varied to be larger as the virtual-image distances become smaller (magnified at higher rate).

(Aerial Perspective)

Further, as another example of the display control process, at least one of value, chroma, and contrast of the display objects may be controlled in accordance with the virtual-image positions of the display objects (specifically, in accordance with the positions in the depth direction of the lines in which the display objects are arranged). In other words, the sense of depth of the display objects may be emphasized by air transparence expression.

Figure 9:
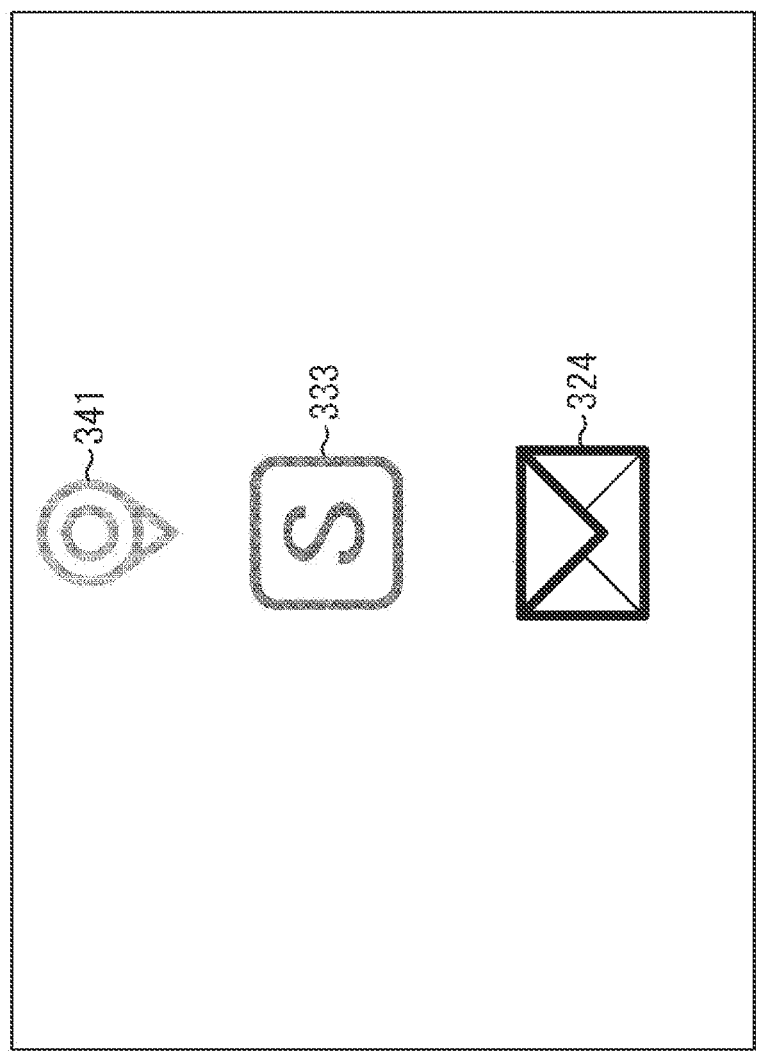
FIG. 9 is a view of still another display example of the display objects.

FIG. 9 illustrates this example. In this case as illustrated in FIG. 9, the at least one of value, chroma, and contrast of the display objects is controlled so that display objects at virtual-image positions on a nearer side as viewed from the user are more clearly visible. In other words, the at least one of value, chroma, and contrast of the display objects is controlled so that display objects at virtual-image positions on a deeper side as viewed from the user are viewed in a more blurred state.

In order to perform such display control, for example, it is only necessary to cause the system controller 211 to control the display control unit 234 so that the at least one of value, chroma, and contrast of the display objects is set in accordance with the virtual-image positions thereof, and to control the display-image processing unit 232 so that the at least one of value, chroma, and contrast of display objects generated by the image generating unit 231 is set to be equal to the value specified by the display control unit 234 (in other words, settings made by the display control unit 234 are reflected (applied) to the display objects generated by the image generating unit 231).

With this, the sense of depth of the display objects can be emphasized, and the operability of the transmissive HMD 100 can be further enhanced.

Note that, the differences in value, chroma, and contrast between the display objects from line to line may be expressed in proportion to the distances from the transmissive HMD 100 to the virtual-image positions (virtual-image distances), or may be varied in accordance with the virtual-image distances.

(Linear Perspective)

Further, as still another example of the display control process, an interval between the display objects in each of the lines may be controlled in accordance with the virtual-image positions of the display objects (specifically, in accordance with the positions in the depth direction of the lines in which the display objects are arranged).

Figure 10:
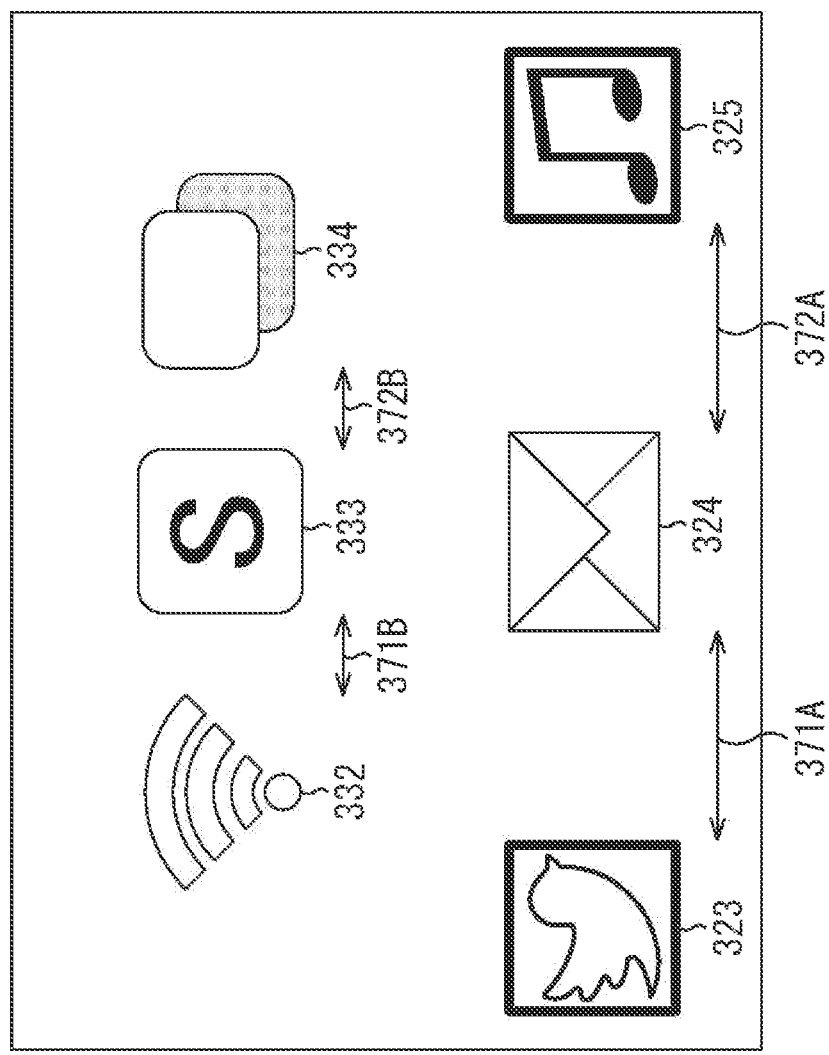
FIG. 10 is a view of yet another display example of the display objects.

FIG. 10 illustrates this example. In FIG. 10, as indicated by double-headed arrows 371A and 371B, and by double-headed arrows 372A and 372B, an interval between the display objects is set to be larger in a line on the nearer side as viewed from the user. In other words, an interval between the display objects is set to be smaller in a line on the deeper side as viewed from the user.

In order to perform such display control, for example, it is only necessary to cause the system controller 211 to control the display control unit 234 so that the interval between the display objects in each of the lines is set in accordance with the virtual-image positions thereof, and to control the display-image processing unit 232 so that the interval between the display objects in each of the lines, which are generated by the image generating unit 231, is set to be equal to the value specified by the display control unit 234 (in other words, settings made by the display control unit 234 are reflected (applied) to the display objects generated by the image generating unit 231).

With this, the sense of depth of the display objects can be emphasized, and the operability of the transmissive HMD 100 can be further enhanced.

Note that, the difference in interval between the display objects from line to line may be expressed in proportion to the distances from the transmissive HMD 100 to the virtual-image positions (virtual-image distances), or may be varied in accordance with the virtual-image distances.

(Texture Gradient)

Further, as yet another example of the display control process, intervals between lines in the depth direction of the display objects may be controlled in accordance with the virtual-image positions of the display objects (specifically, in accordance with the positions in the depth direction of the lines in which the display objects are arranged).

Figure 11:
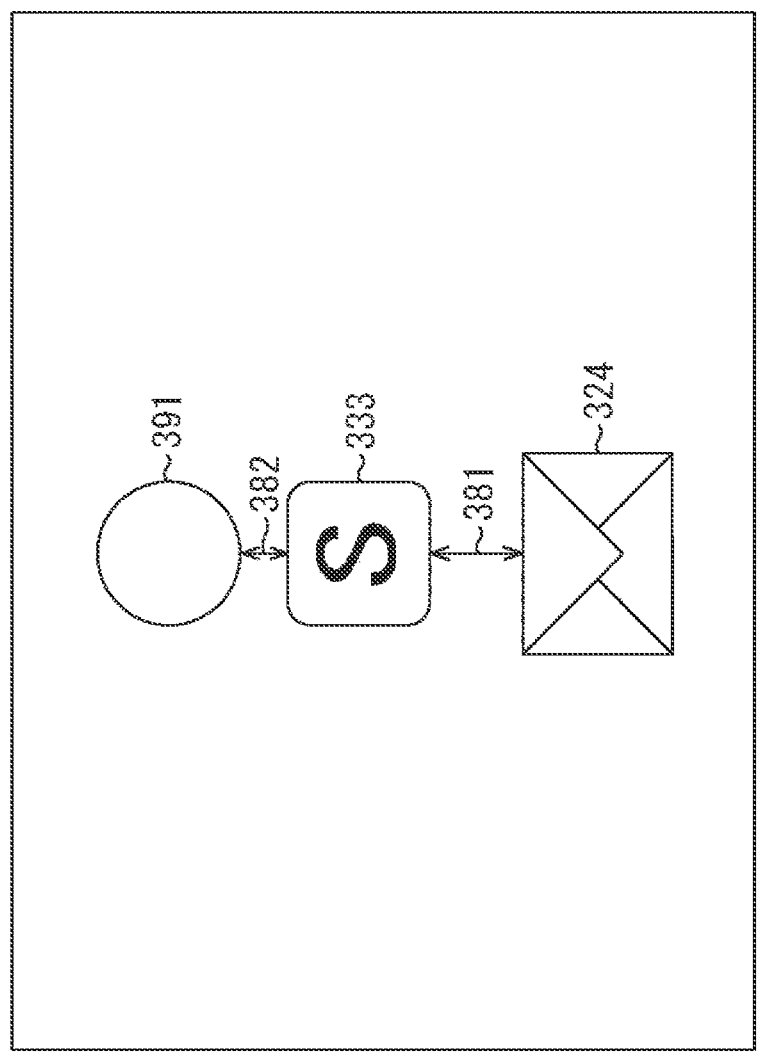
FIG. 11 is a view of yet another display example of the display objects.

FIG. 11 illustrates this example. In FIG. 11, the display objects 324 and 333, and a display object 391 are displayed at positions in the stated order from the near side as viewed from the user. In this case, as indicated by double-headed arrows 381 and 382, an interval between the lines (upper and lower directions of the display objects) is set to be larger on the nearer side as viewed from the user. In other words, an interval between the lines (upper and lower directions of the display objects) is set to be smaller on the deeper side as viewed from the user.

In order to perform such display control, for example, it is only necessary to cause the system controller 211 to control the display control unit 234 so that the intervals between lines in the depth direction of the display objects are set in accordance with the virtual-image positions of the display objects in the lines, and to control the display-image processing unit 232 so that intervals between lines of display objects generated by the image generating unit 231 are set to be equal to the values specified by the display control unit 234 (in other words, settings made by the display control unit 234 are reflected (applied) to the display objects generated by the image generating unit 231).

With this, the sense of depth of the display objects can be emphasized, and the operability of the transmissive HMD 100 can be further enhanced.

(Shading)

Further, as yet another example of the display control process, the display objects may be shaded in accordance with the virtual-image positions of the display objects (specifically, in accordance with the positions in the depth direction of the lines in which the display objects are arranged). With this, the sense of depth of the display objects can be emphasized, and the operability of the transmissive HMD 100 can be further enhanced.

In order to perform such display control, for example, it is only necessary to cause the system controller 211 to control the display control unit 234 so that how the display objects are shaded is set in accordance with the virtual-image positions thereof, and to control the display-image processing unit 232 so that display objects generated by the image generating unit 231 are shaded as set by the display control unit 234 (in other words, settings made by the display control unit 234 are reflected (applied) to the display objects generated by the image generating unit 231).

(Superimposition)

Alternatively, display positions of the display objects may controlled so that at least parts of the display objects arranged in a line on the depth side as viewed from the user are hidden by the display objects arranged in a line on the near side as viewed from the user.

Figure 12:
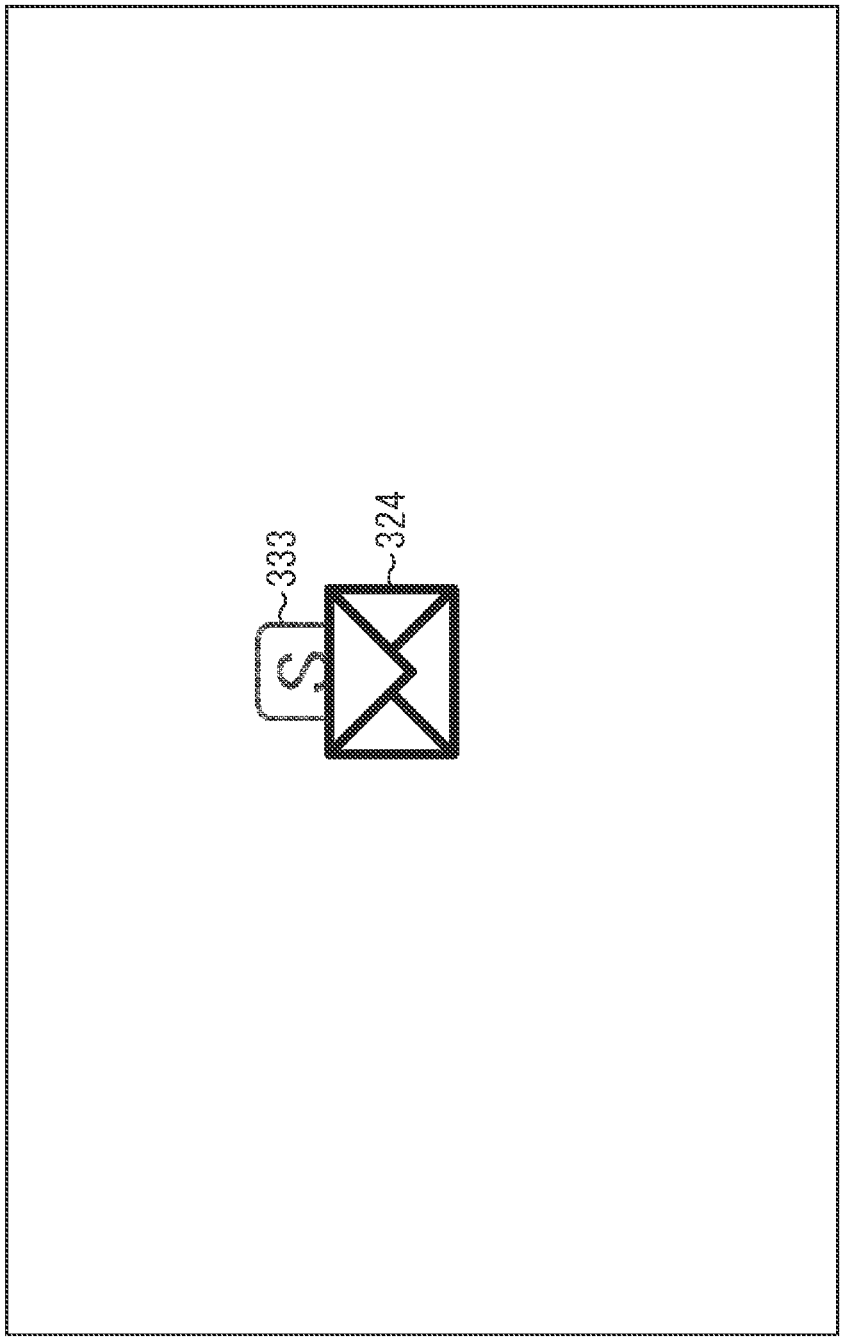
FIG. 12 is a view of yet another display example of the display objects.

FIG. 12 illustrates this example. In FIG. 12, display positions of the display object 324 and the display object 333 are controlled so that a part of the display object 333 arranged on the line on the depth side as viewed from the user (at a virtual-image position on the depth side as viewed from the user) is hidden by the display object 324 arranged in the line on the near side as viewed from the user (at a virtual-image position on the near side as viewed from the user).

In order to perform such display control, for example, it is only necessary to cause the system controller 211 to control the display control unit 234 so that display positions of the display objects are set in accordance with the virtual-image positions thereof, whereby parts of the display objects displayed near and far in the depth direction are superimposed on each other, and to control the display-image processing unit 232 so that display objects generated by the image generating unit 231 are processed, whereby the superimposition set by the display control unit 234 is expressed (in other words, settings made by the display control unit 234 are reflected (applied) to the display objects generated by the image generating unit 231).

In this way, when the display objects arrayed in the depth direction are displayed in a superimposed manner, the sense of depth of the display objects is emphasized by a positional relationship therebetween. In this way, the operability of the transmissive HMD 100 can be further enhanced.

(Hue)

Further, as yet another example of the display control process, hues of the display objects may be controlled in accordance with the virtual-image positions of the display objects (specifically, in accordance with the positions in the depth direction of the lines in which the display objects are arranged). Specifically, display objects in warmer colors may be arranged in the line on the nearer side as viewed from the user, and display objects in cold colors may be arranged in the line on the depth side as viewed from the user.

In order to perform such display control, for example, it is only necessary to cause the system controller 211 to control the display control unit 234 so that the hues of the display objects are set in accordance with the virtual-image positions thereof, and to control the display-image processing unit 232 so that hues of display objects generated by the image generating unit 231 are set to the same hues set by the display control unit 234 (in other words, settings made by the display control unit 234 are reflected (applied) to the display objects generated by the image generating unit 231).

With this, the sense of depth of the display objects can be emphasized by controlling the hues of the display objects, and the operability of the transmissive HMD 100 can be further enhanced.

(Focal Point)

Further, as yet another example of the display control process, degrees of focusing of the display objects may be controlled in accordance with the virtual-image positions of the display objects (specifically, in accordance with the positions in the depth direction of the lines in which the display objects are arranged). Specifically, display objects arranged in the line on the nearest side as viewed from the user may be focused (degree of focusing becomes largest thereat), and display objects arranged in the line on the deeper side as viewed from the user may be blurred in accordance therewith (defocused, in other words, degree of focusing is reduced thereat).

In order to perform such display control, for example, it is only necessary to cause the system controller 211 to control the display control unit 234 so that the degrees of focusing (image blur amounts, specifically, sharpnesses) of the display objects are set in accordance with the virtual-image positions thereof, and to control the display-image processing unit 232 so that degrees of focusing of display objects generated by the image generating unit 231 are set to be equal to the values specified by the display control unit 234 (in other words, settings made by the display control unit 234 are reflected (applied) to the display objects generated by the image generating unit 231).

With this, the sense of depth of the display objects can be emphasized by controlling blur amounts of the display objects (degrees of defocusing), and the operability of the transmissive HMD 100 can be further enhanced.

Note that, the examples described above may be employed in various combinations. With this, the sense of depth of the display objects can be further emphasized, and the operability of the transmissive HMD 100 can be further enhanced.

(Movement)

Alternatively, the sensor unit 221 may include a detection sensor configured to detect changes in position or orientation of the display unit 112. In a case where the detection sensor detects the variations in position or orientation of the display unit 112, the display control unit 234 may control, for example, the display-image processing unit 232 or the display drive unit 233 so that the display positions of the display objects on the display unit 112 are moved in accordance with the changes.

Specifically, when the detection sensor starts to detect the changes in position or orientation of the display unit 112, the display control unit 234 moves the display positions of the display objects linked to local coordinates from positions with respect to which the display unit 112 has not yet been changed in position or orientation into a direction opposite to a direction in which the display unit 112 has been changed in position or orientation. When the detection sensor detects that the changes in position or orientation of the display unit 112 have ended, the display positions of the display objects may be returned to the positions with respect to which the display unit 112 has not yet been changed in position or orientation.

(Horizontal Direction (Yaw Direction))

For example, display objects 323 to 325 and display objects 333 and 334 each linked to local coordinates, and the display object 341 linked to the global coordinates are displayed in the display area of the display unit 112 as illustrated in FIG. 13A. When the user wearing the transmissive HMD 100 as in the state illustrated in FIG. 13A moves the head (face) in a horizontal direction (yaw direction) as illustrated in FIG. 13B, the display objects 323 to 325 and the display objects 333 and 334 each linked to the local coordinates are moved as indicated by arrows 401A and 402A in FIG. 13B in a direction opposite to the direction in which the transmissive HMD 100 is moved. In the case of FIG. 13B, the user moves the head (face) to the right. Thus, the display objects 323 to 325 and the display objects 333 and 334 are moved to the left in the display area as illustrated in FIG. 13B.

Then, as illustrated in FIG. 13C, when the user stops moving the head (face), the display objects 323 to 325 and the display objects 333 and 334 are moved to the right in the display area as indicated by arrows 401B and 402B. In this way, those display objects return to the same positions as the display positions in the state illustrated in FIG. 13A.

With this, the user can feel as if the display objects displayed in the display plane followed the movement of the user.

Further, as illustrated in FIG. 13B, the physical object 311 moves to the left in the display area in conjunction with the movement of the head (face) of the user. In conjunction therewith, the display object 341 linked to the global coordinates moves to the left in the display area as indicated by an arrow 403. Note that, those movements are caused by a shift of a range of the real space within the display area of the display unit 112. Thus, the physical object 311 and the display object 341 as the marker thereof move independently of the movements of the above-mentioned display objects linked to the local coordinates. Thus, as illustrated in FIG. 13C, when the user stops moving the head (face), the physical object 311 and the display object 341 stop moving in conjunction therewith, and hence do not return to their original positions unlike the other display objects linked to the local coordinates.

In this way, the display objects linked to the local coordinates are moved in conjunction with the movement of the display unit 112, and hence a sense of floating of the display objects linked to the local coordinates can be emphasized with respect to the image of the real space. Further, the display objects linked to the local coordinates are moved differently from the display objects linked to the global coordinates and the physical object in the real space. With this, it can be emphasized that the display objects linked to the local coordinates are images relating to the transmissive HMD 100 (images indicating information of the transmissive HMD 100).

Further, in that case, the display control unit 234 may be configured to move the display objects arranged in the line on the nearer side as viewed from the user, for example, by an amount larger than an amount of moving the display objects arranged in the line on the deeper side as viewed from the user.

Specifically, in the case of FIGS. 13B and 13C, as indicated by the arrows 401A and 402A, and by the arrows 401B and402B, the display objects arranged in the line on the nearer side as viewed from the user are moved by a larger amount. With this, the sense of depth of the display objects (differences in position in the depth direction of the display objects in each of the lines) can be emphasized.

Still further, in that case, the display control unit 234 may be configured to move the display objects arranged in the line on the nearer side as viewed from the user, for example, earlier than the display objects arranged in the line on the deeper side as viewed from the user.

Specifically, in the case of FIG. 13C, the display objects 323 to 325 arranged in the line on the nearer side as viewed from the user are moved at a timing earlier than that of the display objects 333 and 334. With this, the sense of depth of the display objects (differences in position in the depth direction of the display objects in each of the lines) can be emphasized.

(Vertical Direction (Pitch Direction))

The same applies to a case of a movement in the vertical direction (pitch direction). For example, the display objects 323 to 325 and the display objects 333 and 334 each linked to the local coordinates, and the display object 341 linked to the global coordinates are displayed in the display area of the display unit 112 as illustrated in FIG. 14A. When the user wearing the transmissive HMD 100 as in the state illustrated in FIG. 14A moves the head (face) in a vertical direction (pitch direction) as illustrated in FIG. 14B, the display objects 323 to 325 and the display objects 333 and 334 each linked to the local coordinates are moved as indicated by arrows 411A and 412A in FIG. 14B in a direction opposite to the direction in which the transmissive HMD 100 is moved. In the case of FIG. 14B, the user moves the head (face) downward. Thus, the display objects 323 to 325 and the display objects 333 and 334 are moved upward in the display area as illustrated in FIG. 14B.

Then, as illustrated in FIG. 14C, when the user stops moving the head (face), the display objects 323 to 325 and the display objects 333 and 334 are moved downward in the display area as indicated by arrows 411B and 412B. In this way, those display objects return to the same positions as the display positions in the state illustrated in FIG. 14A.

With this, the user can feel as if the display objects displayed in the display plane followed the movement of the user.

Further, as illustrated in FIG. 14B, the physical object 311 moves upward in conjunction with the movement of the head (face) of the user. In conjunction therewith, the display object 341 linked to the global coordinates moves to the right as indicated by an arrow 413. Note that, those movements are caused by a shift of a range of the real space within the display area of the display unit 112. Thus, the physical object 311 and the display object 341 as the marker thereof move independently of the movements of the above-mentioned display objects linked to the local coordinates. Thus, as illustrated in FIG. 14C, when the user stops moving the head (face), the physical object 311 and the display object 341 stop moving in conjunction therewith, and hence do not return to their original positions unlike the other display objects linked to the local coordinates.

In this way, the display objects linked to the local coordinates are moved in conjunction with the movement of the display unit 112, and hence a sense of floating of the display objects linked to the local coordinates can be emphasized with respect to the image of the real space. Further, the display objects linked to the local coordinates are moved differently from the display objects linked to the global coordinates and the physical object in the real space. With this, it can be emphasized that the display objects linked to the local coordinates are images relating to the transmissive HMD 100 (images indicating information of the transmissive HMD 100).

Further, in that case, the display control unit 234 may be configured to move the display objects arranged in the line on the nearer side as viewed from the user, for example, by an amount larger than an amount of moving the display objects arranged in the line on the deeper side as viewed from the user.

Specifically, in the case of FIGS. 14B and 14C, as indicated by the arrows 411A and 412A, and by the arrows 411B and412B, the display objects arranged in the line on the nearer side as viewed from the user are moved by a larger amount. With this, the sense of depth of the display objects (differences in position in the depth direction of the display objects in each of the lines) can be emphasized.

Still further, in that case, the display control unit 234 may be configured to move the display objects arranged in the line on the nearer side as viewed from the user, for example, earlier than the display objects arranged in the line on the deeper side as viewed from the user.

Specifically, in the case of FIG. 14C, the display objects 323 to 325 arranged in the line on the nearer side as viewed from the user are moved at a timing earlier than that of the display objects 333 and 334. With this, the sense of depth of the display objects (differences in position in the depth direction of the display objects in each of the lines) can be emphasized.

The processes described above of each unit are executed under the control by the system controller 211.

(Display Control Process)

Figure 15B:
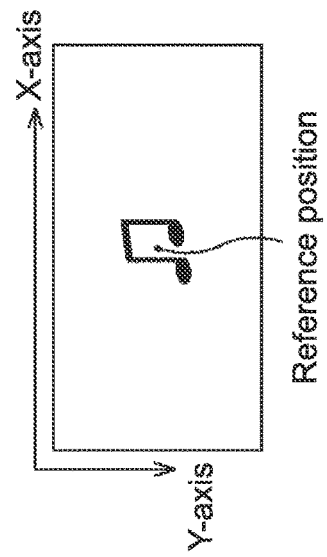
FIGS. 15A and 15B are views of examples of parameters.
Figure 15A:
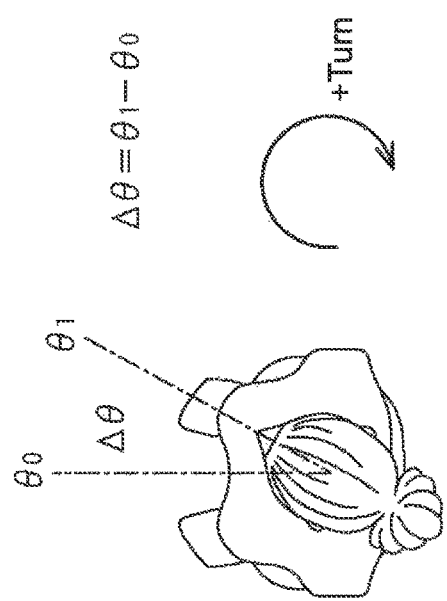

FIG. 15A illustrates an example of how to specify a moving direction and calculate a moving amount based on detected movement of the transmissive HMD 100 according to this embodiment. Further, FIG. 15B illustrates an example of a reference position and an example of coordinate axes defined in the display plane according to this embodiment. In the example illustrated in FIG. 15B, the X-axis corresponding to the horizontal direction and the Y-axis corresponding to the vertical direction are defined in the display plane. Note that, the reference position according to this embodiment is not necessarily limited to the one point as illustrated in FIG. 15B, and may be set, for example, as a region including a plurality of coordinate pairs.

Specifically, the transmissive HMD 100 forms an angle $\theta$ to be specified based on detected data acquired from the sensor provided in the sensor unit 221, which is capable of detecting movement. Based, for example, on the detected movement, specifically, on an angle $\theta_0$ at a first time point and an angle $\theta_1$ at a second time point (time point after the first time point) illustrated in FIG. 15A, the system controller 211 specifies the moving direction and calculates the moving amount by the following equation (1) below. In the equation (1), the plus sign and the minus sign of $\Delta\theta$ each indicate the moving direction, and an absolute value of $\Delta\theta$ represents the moving amount. Note that, in the examples illustrated in FIG. 15, a turning direction indicated by an arrow in FIG. 15A is defined as a positive direction.

$$\Delta\theta=\theta_1-\theta_0 \quad (1)$$

Figure 16:
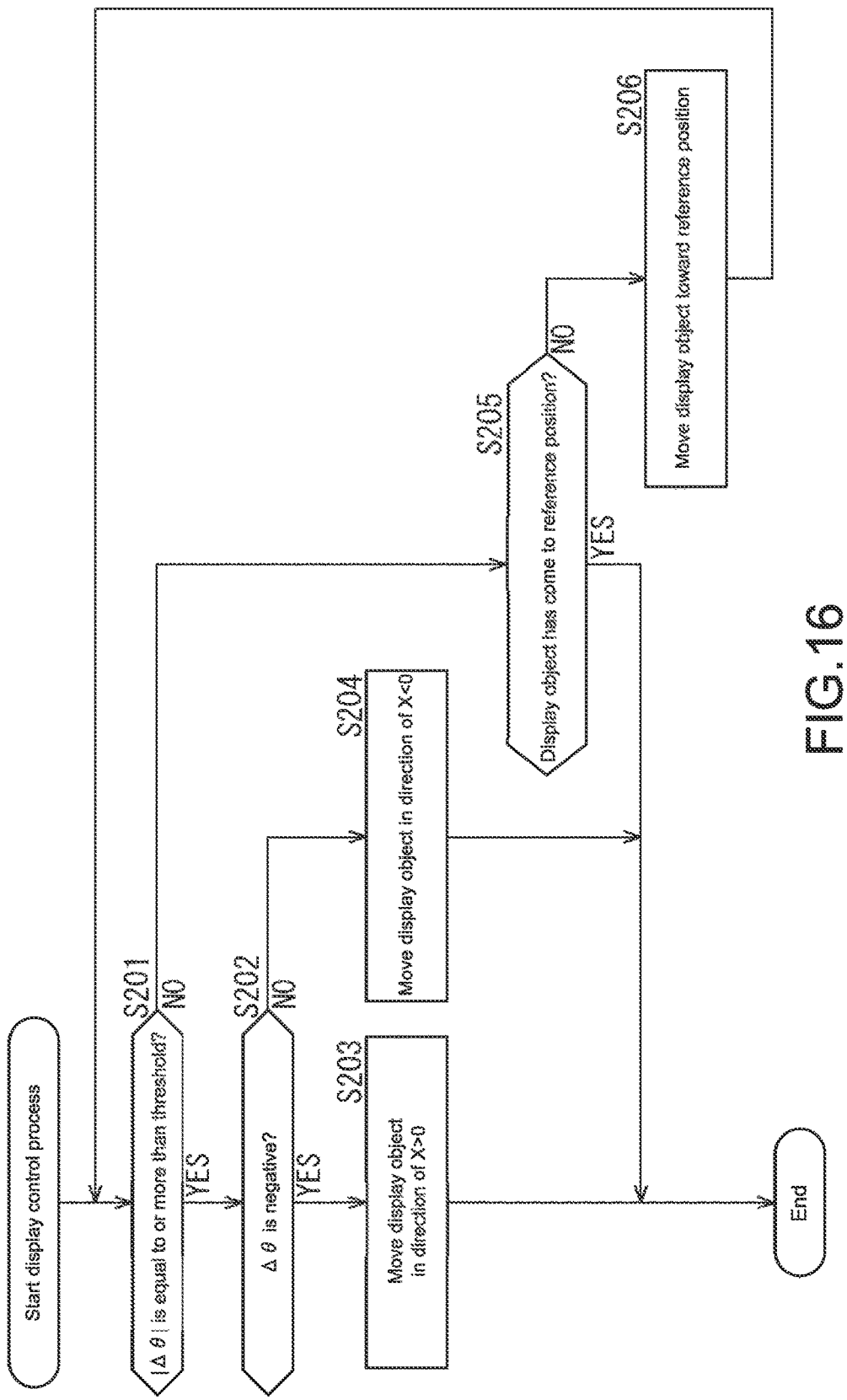
FIG. 16 is a flowchart showing an example of a flow of another display control process.

Next, with reference to the flowchart of FIG. 16, description is made of an example of a flow of another display control process in a case where a display object is moved as described above using such parameters.

When this display control process is started, in Step S201, the system controller 211 determines whether or not the calculated absolute value of $\Delta\theta$ (in other words, movement amount according to this embodiment) is equal to or more than a preset threshold. This preset threshold may be a preset fixed value, or may be a variable that can be set as appropriate, for example, through operation by the user.

Note that, for example, in Step S201, the system controller 211 may determine whether or not the calculated absolute value of $\Delta\theta$ is larger than the preset threshold.

When the system controller 211 determines that the absolute value of $\Delta\theta$ is equal to or more than the preset threshold, the flow proceeds to Step S202. In Step S202, the system controller 211 determines whether or not the calculated $\Delta\theta$ is negative.

When the system controller 211 determines that the calculated $\Delta\theta$ is negative, the flow proceeds to Step S203. In Step S203, the system controller 211 controls the display-image processing unit 232 or the display drive unit 233 via the display control unit 234 so that the display object is moved in a positive direction (direction of X>0) on the X-axis in the display plane. When the process of Step S203 is ended, the display control process is ended.

Further, in Step S202, when the system controller 211 determines that the calculated $\Delta\theta$ is positive, the flow proceeds to Step S204. In Step S204, the system controller 211 controls the display-image processing unit 232 or the display drive unit 233 via the display control unit 234 so that the display object is moved in a negative direction (direction of X<0) on the X-axis in the display plane. When the process of Step S204 is ended, the display control process is ended.

Further, in Step S201, when the system controller 211 determines that the absolute value of $\Delta\theta$ is not equal to or more than the preset threshold, the flow proceeds to Step S205. In Step S205, the system controller 211 controls the display-image processing unit 232 or the display drive unit 233 via the display control unit 234 so that whether or not the display object has come to the reference position is determined. When the system controller 211 determines that current coordinates of the display object and coordinates of the reference position are the same as each other, the system controller 211 determines that the display object has come to the reference position, and the display control process is ended.

Further, in Step S205, when the system controller 211 determines that the display object has not come to the reference position, the flow proceeds to Step S206. In Step S206, the system controller 211 controls the display-image processing unit 232 or the display drive unit 233 via the display control unit 234 so that the display object is moved toward the reference position. When the process of Step S206 is ended, the flow returns to Step S201, and the subsequent steps are repeated.

By executing the display control process in this way, the user can feel as if the display object displayed in the display plane followed the movement of the user.

Note that, as described above, in order to move the display objects arranged in the line on the nearer side by an amount larger than an amount of moving the display objects arranged in the line on the deeper side as viewed from the user, it is only necessary to cause the system controller 211 (display control unit 234) to control corresponding units so that those display objects are moved differently from display objects in other lines, that is, moved in such a manner (larger amount in the line on the nearer side) by the processes of Steps S203, S204, and S206.

Further, as described above, in order to move the display objects arranged in the line on the nearer side earlier than the display objects arranged in the line on the deeper side as viewed from the user, it is only necessary to cause the system controller 211 (display control unit 234) to control corresponding units so that those display objects are moved differently from display objects in other lines, that is, moved in such a manner (earlier in the lines on the nearer side) by the processes of Step S203, S204, and S206.

(Turning Direction (Roll Direction))

Note that, as for movements in a turning direction (roll direction), not only the display objects linked to the local coordinates but also the display objects linked to the global coordinates roll in a direction opposite to a direction in which the user tilts the head (face) and at an angle at which the user tilts the head (face). In other words, how the display objects are displayed is controlled in a manner that the horizontal direction (or vertical direction) in the real space and the horizontal direction (or vertical direction) of the display objects are always matched with each other.

Specifically, when the user wearing the transmissive HMD 100 as in the state illustrated in FIG. 17A moves the head (face) to the left in the turning direction (roll direction) as illustrated in FIG. 17B, the display objects 323 to 325 and the display objects 333 and 334 that are displayed in the display area of the display unit 112 as in FIG. 17A turn to the right in the turning direction in the display area at an angle equal to a turning angle of the transmissive HMD 100 as illustrated in FIG. 17B.

Further, specifically, when the user wearing the transmissive HMD 100 as in the state illustrated in FIG. 17A moves the head (face) to the right in the turning direction (roll direction) as illustrated in FIG. 17C, the display objects 323 to 325 and the display objects 333 and 334 that are displayed in the display area of the display unit 112 as in FIG. 17A turn to the left in the turning direction in the display area at an angle equal to a turning angle of the transmissive HMD 100 as illustrated in FIG. 17C.

Note that, in this case, as illustrated in FIGS. 17B and 17C, the physical object 311 and the display object 341 linked to the global coordinates turn as well as the display objects linked to the local coordinates.

(Display Control Process)

Figure 18B:
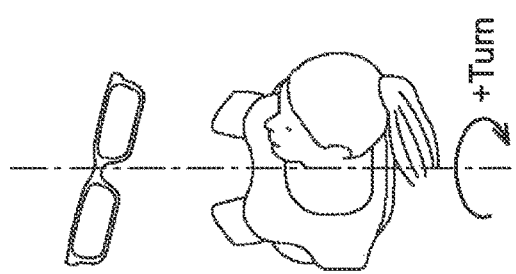
FIGS. 18A and 18B are views of an example of a parameter.
Figure 18A:
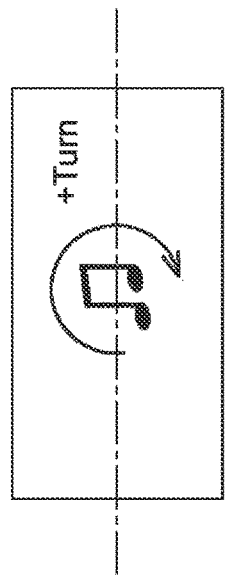
Figure 19:
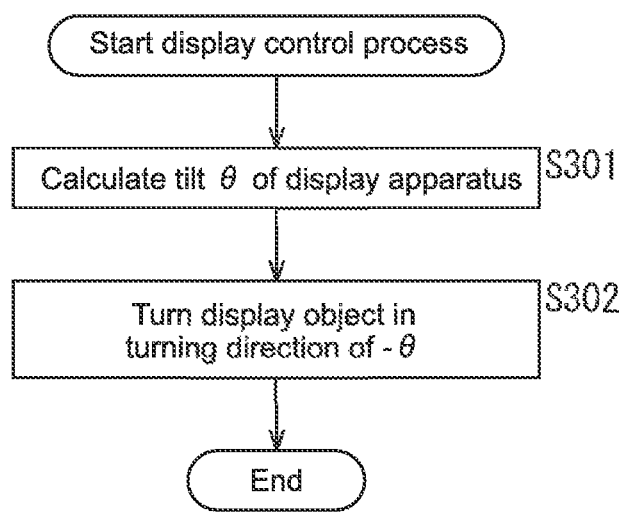
FIG. 19 is a flowchart showing an example of a flow of still another display control process.

In the following, turning directions indicated by the arrows in FIGS. 18A and 18B are each defined as a positive direction. With reference to the flowchart of FIG. 19, description is made of an example of a flow of still another display control process in a case where a display object is turned as described above.

When this display control process is started, in Step S301, the system controller 211 calculates a tilt θ of the display apparatus (transmissive HMD 100). The system controller 211 calculates the tilt θ based, for example, on detected data acquired from the sensor provided in the sensor unit 221, which is capable of detecting the movement of the transmissive HMD 100. Note that, the plus sign and the minus sign of the tilt θ each indicates a tilt direction, and an absolute value of the tilt θ represents a tilt amount.

When the tilt θ (in other words, tilt direction and tilt amount in accordance with the detected movement) is calculated, in Step S302, the system controller 211 controls the display-image processing unit 232 or the display drive unit 233 via the display control unit 234 so that the display object is turned by an amount corresponding to the absolute value of the tilt θ (in other words, tilt amount) in a direction opposite to the direction indicated by the sign of the tilt θ (in other words, tilt direction). In this way, the display object is moved.

When the process of Step S302 is ended, the display control process is ended. By executing the display control process in this way, irrespective of the tilt of the display unit 112, the horizontal direction (vertical direction) of the display object displayed on the display unit 112 can be always matched with the horizontal direction (vertical direction) in the real space on which the display object is superimposed. Thus, images are visually naturally visible to the user, and hence the sense of discomfort to the user can be reduced. With this, the operability of the transmissive HMD 100 can be further enhanced.

In the description hereinabove, the display unit 112 is a transmissive display configured to transmit light. However, a non-transmissive display configured not to transmit light may be employed as the display unit 112. Specifically, on the display unit 112 (non-transmissive display), images to be viewed from a plurality of viewpoints (for example, display objects such as a menu icon) may be displayed as a three-dimensional image in a superimposed manner on captured images obtained by the imaging unit 251 (also referred to as through images). Also in that case, as in the case of the transmissive display described hereinabove, it is only necessary to display the display objects on the display unit 112 in a manner that the display objects are arranged in a plurality of lines that are different from each other in position in the depth direction on a near side with respect to a scene in the real space. In other words, the present technology is applicable, for example, not only to the transmissive HMD 100 but also to a non-transmissive HMD.

The series of processes described hereinabove may be executed by hardware, or may be executed by software. In a case where the series of processes described hereinabove is executed by software, programs of the software are installed via a network or from recording media.

Examples of the recording media include the removable medium 264 that is delivered separately from the apparatus main body as illustrated, for example, in FIG. 3 so that programs stored therein are distributed to the user. Examples of the removable media 264 include not only magnetic disks (such as flexible disk) and optical disks (such as a CD-ROM and a DVD), but also magneto-optical disks (such as an MD (MiniDisc)) and a semiconductor memory.

In that case, such removable media are mounted to the drive so that the programs can be installed to the storage unit 261.

Alternatively, those programs may be provided via wired or wireless transmission media such as a local area network, the Internet, and digital satellite broadcasting. In those cases, the programs may be received via the communication unit 262, and then installed to the storage unit 261 of the apparatus.

Still alternatively, those programs may be pre-installed in the ROM of the system controller 211 or the storage unit 261.

Note that, the programs to be executed by the computer may be executed in time series in the order described in this specification, or may be executed parallel to each other or at necessary timings such as a timing of a call.

Further, in this specification, the steps describing the programs stored in the recording media include, as a matter of course, not only processes to be executed in time series in the order described hereinabove, but also processes to be executed not necessarily in time series, in other words, executed in parallel or individually.

Still further, the processes of the steps described hereinabove may be executed in the apparatus described hereinabove, or may be executed in any other apparatus than the apparatus described hereinabove. In that case, it is only necessary that the apparatus to execute the processes have functions that are necessary for executing the processes (such as function blocks). Further, it is only necessary to transmit information items that are necessary for the processes as appropriate to the apparatus.

In addition, in this specification, the "system" refers to a collection of a plurality of components (such as apparatus and modules (parts)), and all the components need not necessarily be provided in the same casing. Thus, both a plurality of apparatus that are contained respectively in their casings and connected to each other via a network, and a single apparatus that has a single casing containing a plurality of modules are encompassed in the definition of the "system."

Further, the configuration described as a single apparatus (or processing unit) hereinabove may be divided into a plurality of apparatus (or processing units). In contrast, the configurations described as a plurality of apparatus (or processing units) hereinabove may be integrated into a single apparatus (or processing unit). Still further, as a matter of course, configurations other than those described hereinabove may be added to the configurations of the apparatus (or processing units). Yet further, as long as the configurations and operations of the entire system are substantially unchanged, a part of a configuration of a certain apparatus (or processing unit) may be incorporated in a configuration of another apparatus (or another processing unit).

The technical scope of the present disclosure, which is described in detail hereinabove in the preferred embodiments of the present disclosure with reference to the accompanying drawings, is not limited to those examples. It is obvious that various changes and modifications could have been made by those who have common knowledge in the technical field of the present disclosure within the technical scope described in "What is claimed is." It should be understood that those changes and modifications obviously belong to the technical scope of the present disclosure.

For example, the present technology may include a system of cloud computing in which a single function is shared with and cooperatively exerted in a plurality of apparatus via a network.

Further, the steps described above with reference to the flowcharts may be executed in a single apparatus, or may be shared with and executed in a plurality of apparatus.

Still further, in a case where a plurality of processes are contained in a single step, the plurality of processes contained in the single step may be executed in a single apparatus, or may be shared with and executed in a plurality of apparatus.

In addition, the present technology is not limited thereto, and may be carried out by any type of configuration to be mounted to such apparatus or to apparatus having such systems, specifically, a processor as, for example, system LSI (Large Scale Integration), a module using a plurality of the processors and the like, a unit using a plurality of the modules, and a set obtained by adding other functions to the unit (that is, a part of a configuration of an apparatus).

Note that, the present technology may employ the following configurations.

(1) An image display apparatus, including:
a display unit configured to allow a real space to be transparently viewed and configured to display a three-dimensional image; and
a display control unit configured to display a plurality of the three-dimensional images on the display unit in a manner that the plurality of the three-dimensional images are arranged in a plurality of lines that are different from each other in position in a depth direction on a near side with respect to the real space.

(2) The image display apparatus according to any one of Item (1) and Items (3) to (13), in which the display control unit controls sizes of the plurality of the three-dimensional images in accordance with the positions in the depth direction of the plurality of lines in which the plurality of the three-dimensional images are arranged.

(3) The image display apparatus according to any one of Items (1) and (2) and Items (4) to (13), in which the display control unit controls at least one of value, chroma, and contrast of the plurality of the three-dimensional images in accordance with the positions in the depth direction of the plurality of lines in which the plurality of the three-dimensional images are arranged.

(4) The image display apparatus according to any one of Items (1) to (3) and Items (5) to (13), in which the display control unit controls, in accordance with the positions in the depth direction of the plurality of lines in which the plurality of the three-dimensional images are arranged, an interval between the plurality of the three-dimensional images in each of the plurality of lines.

(5) The image display apparatus according to any one of Items (1) to (4) and Items (6) to (13), in which the display control unit controls, in accordance with the positions in the depth direction of the plurality of lines in which the plurality of the three-dimensional images are arranged, an interval between the plurality of lines in the depth direction.

(6) The image display apparatus according to any one of Items (1) to (5) and Items (7) to (13),
in which the plurality of lines in which the plurality of the three-dimensional images are arranged include
a line on a depth side as viewed from a user, and
a line on the near side as viewed from the user,
in which the plurality of the three-dimensional images include
a plurality of three-dimensional images that are arranged in the line on the depth side as viewed from the user, and
a plurality of three-dimensional images that are arranged in the line on the near side as viewed from the user, and
in which the display control unit controls display positions of the plurality of the three-dimensional images so that at least parts of the plurality of three-dimensional images that are arranged in the line on the depth side as viewed from the user are hidden by the plurality of three-dimensional images that are arranged in the line on the near side as viewed from the user.

(7) The image display apparatus according to any one of Items (1) to (6) and Items (8) to (13), in which the display control unit controls hues of the plurality of the three-dimensional images in accordance with the positions in the depth direction of the plurality of lines in which the plurality of the three-dimensional images are arranged.

(8) The image display apparatus according to any one of Items (1) to (7) and Items (9) to (13), in which the display control unit controls degrees of focusing of the plurality of the three-dimensional images in accordance with the positions in the depth direction of the plurality of lines in which the plurality of the three-dimensional images are arranged.

(9) The image display apparatus according to any one of Items (1) to (8) and Items (10) to (13), in which the display control unit controls, in accordance with roles assigned respectively to the plurality of the three-dimensional images, in which of the plurality of lines the plurality of the three-dimensional images are arranged.

(10) The image display apparatus according to any one of Items (1) to (9) and Items (11) to (13), further including a detection unit configured to detect changes in at least one of position and orientation of the display unit,
in which, when the detection unit detects the changes in the at least one of position and orientation of the display unit, the display control unit causes the plurality of the three-dimensional images to be moved in accordance with the changes.

(11) The image display apparatus according to any one of Items (1) to (10) and Items (12) and (13),
in which, when the detection unit starts to detect the changes in the at least one of position and orientation of the display unit, the display control unit causes display positions of the plurality of the three-dimensional images to be moved from positions with respect to which the display unit has not yet been changed in any of position and orientation into a direction opposite to a direction in which the display unit has been changed in the at least one of position and orientation, and
in which, when the detection unit detects that the changes in the at least one of position and orientation have ended, the display control unit causes the display positions of the plurality of the three-dimensional images to be returned to the positions with respect to which the display unit has not yet been changed in the any of position and orientation.

(12) The image display apparatus according to any one of Item (1) and Items (11) to (13),
in which the plurality of lines in which the plurality of the three-dimensional images are arranged include
a line on a deeper side as viewed from a user, and
a line on a nearer side as viewed from the user,
in which the plurality of the three-dimensional images include
a plurality of three-dimensional images that are arranged in the line on the deeper side as viewed from the user, and
a plurality of three-dimensional images that are arranged in the line on the nearer side as viewed from the user, and
in which the display control unit causes the plurality of three-dimensional images that are arranged in the line on the nearer side as viewed from the user to be moved by an amount larger than an amount of moving the plurality of three-dimensional images that are arranged in the line on the deeper side as viewed from the user.

(13) The image display apparatus according to any one of Items (1) to (12),
in which the plurality of lines in which the plurality of the three-dimensional images are arranged include
a line on a deeper side as viewed from a user, and
a line on a nearer side as viewed from the user,
in which the plurality of the three-dimensional images include
a plurality of three-dimensional images that are arranged in the line on the deeper side as viewed from the user, and
a plurality of three-dimensional images that are arranged in the line on the nearer side as viewed from the user, and
in which the display control unit causes the plurality of three-dimensional images that are arranged in the line on the nearer side as viewed from the user to be moved earlier than the plurality of three-dimensional images that are arranged in the line on the deeper side as viewed from the user.

(14) An image display method, including displaying a plurality of three-dimensional images on a display unit in a manner that the plurality of three-dimensional images are arranged in a plurality of lines that are different from each other in position in a depth direction on a near side with respect to the real space, the display unit being configured to allow a real space to be transparently viewed and configured to display the plurality of three-dimensional images.

What is claimed is:

1. An image display apparatus, comprising:
a display unit configured to allow a real space to be transparently viewed and configured to display a plurality of three-dimensional images;
a detection unit configured to detect changes in at least one of position and orientation of the display unit; and
a display control unit configured to display the plurality of three-dimensional images on the display unit in a manner that multiple images of the plurality of three-dimensional images are arranged in each line of a plurality of lines that are different from each other in position in a depth direction on a near side with respect to the real space,
wherein, when the detection unit detects the changes in the at least one of position and orientation of the display unit, the display control unit causes the plurality of the three-dimensional images to be moved in accordance with the changes, and
wherein the display unit and the display control unit are each implemented via at least one processor.

2. The image display apparatus according to claim 1, wherein the display control unit controls sizes of the plurality of the three-dimensional images in accordance with the positions in the depth direction of the plurality of lines in which the plurality of the three-dimensional images are arranged.

3. The image display apparatus according to claim 1, wherein the display control unit controls at least one of value, chroma, and contrast of the plurality of the three-dimensional images in accordance with the positions in the depth direction of the plurality of lines in which the plurality of the three-dimensional images are arranged.

4. The image display apparatus according to claim 1, wherein the display control unit controls, in accordance with the positions in the depth direction of the plurality of lines in which the plurality of the three-dimensional images are arranged, an interval between the plurality of the three-dimensional images in each of the plurality of lines.

5. The image display apparatus according to claim 1, wherein the display control unit controls, in accordance with the positions in the depth direction of the plurality of lines in which the plurality of the three-dimensional images are arranged, an interval between the plurality of lines in the depth direction.

6. The image display apparatus according to claim 1,
wherein the plurality of lines in which the plurality of the three-dimensional images are arranged include
a line on a depth side as viewed from a user, and
a line on the near side as viewed from the user,
wherein the plurality of the three-dimensional images include
a plurality of three-dimensional images that are arranged in the line on the depth side as viewed from the user, and
a plurality of three-dimensional images that are arranged in the line on the near side as viewed from the user, and
wherein the display control unit controls display positions of the plurality of the three-dimensional images so that at least parts of the plurality of three-dimensional images that are arranged in the line on the depth side as viewed from the user are hidden by the plurality of three-dimensional images that are arranged in the line on the near side as viewed from the user.

7. The image display apparatus according to claim 1, wherein the display control unit controls hues of the plurality of the three-dimensional images in accordance with the positions in the depth direction of the plurality of lines in which the plurality of the three-dimensional images are arranged.

8. The image display apparatus according to claim 1, wherein the display control unit controls degrees of focusing of the plurality of the three-dimensional images in accordance with the positions in the depth direction of the plurality of lines in which the plurality of the three-dimensional images are arranged.

9. The image display apparatus according to claim 1, wherein the display control unit controls, in accordance with roles assigned respectively to the plurality of the three-dimensional images, the plurality of lines in which the plurality of the three-dimensional images are arranged.

10. The image display apparatus according to claim 1, wherein, when the detection unit starts to detect the changes in the at least one of position and orientation of the display unit, the display control unit causes display positions of the plurality of the three-dimensional images to be moved from positions with respect to which the display unit has not yet been changed in any of position and orientation into a direction opposite to a direction in which the display unit has been changed in the at least one of position and orientation, and wherein, when the detection unit detects that the changes in the at least one of position and orientation have ended, the display control unit causes the display positions of the plurality of the three-dimensional images to be returned to the positions with respect to which the display unit has not yet been changed in the any of position and orientation.

11. The image display apparatus according to claim 10, wherein the plurality of lines in which the plurality of the three-dimensional images are arranged include
   a line on a deeper side as viewed from a user, and
   a line on a nearer side as viewed from the user,
wherein the plurality of the three-dimensional images include
   a plurality of three-dimensional images that are arranged in the line on the deeper side as viewed from the user, and
   a plurality of three-dimensional images that are arranged in the line on the nearer side as viewed from the user, and
wherein the display control unit causes the plurality of three-dimensional images that are arranged in the line on the nearer side as viewed from the user to be moved by an amount larger than an amount of moving the plurality of three-dimensional images that are arranged in the line on the deeper side as viewed from the user.

12. The image display apparatus according to claim 10, wherein the plurality of lines in which the plurality of the three-dimensional images are arranged include
   a line on a deeper side as viewed from a user, and
   a line on a nearer side as viewed from the user,
wherein the plurality of the three-dimensional images include
   a plurality of three-dimensional images that are arranged in the line on the deeper side as viewed from the user, and
   a plurality of three-dimensional images that are arranged in the line on the nearer side as viewed from the user, and
wherein the display control unit causes the plurality of three-dimensional images that are arranged in the line on the nearer side as viewed from the user to be moved earlier than the plurality of three-dimensional images that are arranged in the line on the deeper side as viewed from the user.

13. An image display method, performed via at least one processor, the method comprising:
   detecting changes in at least one of position and orientation of a display unit; and
   displaying a plurality of three-dimensional images on the display unit in a manner that multiple images of the plurality of three-dimensional images are arranged in each line of a plurality of lines that are different from each other in position in a depth direction on a near side with respect to the real space, the display unit being configured to allow a real space to be transparently viewed and configured to display the plurality of three-dimensional images,
wherein the detected changes in the at least one of position and orientation of the display unit cause the plurality of the three-dimensional images to be moved in accordance with the changes.

\* \* \* \* \*